(12) United States Patent
Yang et al.

(10) Patent No.: US 9,094,685 B2
(45) Date of Patent: Jul. 28, 2015

(54) EFFICIENT CODING COMPLEXITY ESTIMATION FOR VIDEO TRANSCODING SYSTEMS

(75) Inventors: Kyeong H. Yang, Freehold, NJ (US); Beibei Wang, Morganville, NJ (US)

(73) Assignee: Dialogic Corporation, Montreal (CA)

( * ) Notice: Subject to any disclaimer, the term of this patent is extended or adjusted under 35 U.S.C. 154(b) by 800 days.

(21) Appl. No.: 12/887,022

(22) Filed: Sep. 21, 2010

(65) Prior Publication Data

US 2012/0069896 A1  Mar. 22, 2012

(51) Int. Cl.
| | |
|---|---|
| H04N 19/40 | (2014.01) |
| H04N 19/146 | (2014.01) |
| H04N 19/147 | (2014.01) |
| H04N 19/172 | (2014.01) |
| H04N 19/149 | (2014.01) |
| H04N 19/107 | (2014.01) |

(52) U.S. Cl.
CPC ............. *H04N 19/40* (2014.11); *H04N 19/107* (2014.11); *H04N 19/146* (2014.11); *H04N 19/147* (2014.11); *H04N 19/149* (2014.11); *H04N 19/172* (2014.11)

(58) Field of Classification Search
CPC ... H04N 19/40; H04N 19/146; H04N 19/147; H04N 19/149
See application file for complete search history.

(56) References Cited

U.S. PATENT DOCUMENTS

| | | | |
|---|---|---|---|
| 6,650,705 | B1 | 11/2003 | Vetro et al. |
| 7,706,441 | B2 | 4/2010 | Choi et al. |
| 2005/0232497 | A1 | 10/2005 | Yogeshwar et al. |
| 2007/0036227 | A1 | 2/2007 | Ishtiaq et al. |
| 2008/0019443 | A1 | 1/2008 | He et al. |
| 2009/0086816 | A1 * | 4/2009 | Leontaris et al. ........ 375/240.03 |
| 2009/0097560 | A1 * | 4/2009 | Robertson ................ 375/240.16 |
| 2009/0323798 | A1 | 12/2009 | He et al. |
| 2011/0090960 | A1 * | 4/2011 | Leontaris et al. ........ 375/240.12 |

OTHER PUBLICATIONS

Anthony Vetro, Charilaos Christopoulos, and Huifang Sun, Video Transcoding Architectures and Techniques: An Overview, IEEE Signal Processing Magazine © 2003 IEEE, Mar. 2003, pp. 18-29.

Thomas Wiegand, Gary J. Sullivan, Gisle Bjøntegaard, and Ajay Luthra, Overview of the H.264/AVC Video Coding Standard, IEEE Transactions on Circuits and systems for Video Technology, vol. 13, No. 7, Jul. 2003, pp. 560-576.

Lilla Böröczky, Agnes Y. Ngai, Edward F. Westermann, Joint Rate Control with Look-Ahead for Multi-Program Video Coding, IEEE Transactions on Circuits and Systems for Video Technology, vol. 10, No. 7, Oct. 2000, pp. 1159-1163.

(Continued)

*Primary Examiner* — William C Vaughn, Jr.
*Assistant Examiner* — Michael J Hess
(74) *Attorney, Agent, or Firm* — Chapin IP Law, LLC

(57) ABSTRACT

Systems and methods of transcoding video bitstreams that employ highly efficient look-ahead approaches to video transcoding. The systems and methods perform video transcoding in the pixel domain to make successive adjustments to estimates of the coding complexity of video frames in input video bitstreams. The systems and methods can employ the adjusted estimates of the coding complexity in a rate control function to provide improved bit allocations for the video frames in transcoded output video bitstreams, thereby enhancing overall perceptual quality.

14 Claims, 15 Drawing Sheets

(56) References Cited

OTHER PUBLICATIONS

Kyeong Ho Yang, Wenwu Zhu, and A. Farid Faryar, Perceptual Quantization for Predictive Coding of Images, Lucent Technologies, Bell Laboratories, © 1999 IEEE, khyang@lucent.com, pp. 381-385.

Atul Puri and R. Avavind, Motion-Compensated Video Coding with Adaptive Perceptual Quantization, IEEE Transactions on Circuits and Systems for Video Technology, vol. 1, No. 4, Dec. 1991, © 1991 IEEE, pp. 351-361.

* cited by examiner

EFFICIENT CODING COMPLEXITY ESTIMATION FOR VIDEO TRANSCODING SYSTEMS

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of transcoding video bitstreams, and more specifically to systems and methods of transcoding video bitstreams compressed according to coding formats such as H.263, H.264, and MPEG-4.

BACKGROUND OF THE INVENTION

In recent years, there has been an increasing need for systems and methods of transcoding video bitstreams, due in no small part to the growing diversity of available multimedia applications, multimedia networks, video coding standards, video displays, etc. For example, the H.264 video coding standard has provided significant enhancements in coding efficiency over earlier video coding standards, and has been widely employed in multimedia applications such as real-time video communications and video streaming. Because multimedia applications such as video streaming generally allow significant delays (e.g., up to 5 seconds or more) to be incorporated in the video bitstream transcoding process, conventional video transcoding systems have typically employed a so-called "look-ahead" approach to video transcoding, taking time to analyze "future" video frames in the video bitstream to provide improved bit allocations for the video frames currently being transcoded, thereby enhancing overall perceptual quality. In general, for video transcoding systems employing the look-ahead approach, the bit allocation for a current video frame typically improves as the number of future video frames available for analysis increases.

Conventional video transcoding systems employing look-ahead approaches to video transcoding have drawbacks, however, in that the system resources may strictly limit the number of future video frames that can be stored and analyzed. For example, in a look-ahead approach that allows at least 5 seconds of delay, a conventional video transcoding system receiving an input video bitstream at 30 frames per second (fps) would need to store at least 150 video frames for subsequent analysis before any video frames in the input bitstream could be transcoded. Nevertheless, constraints imposed by the system resources may make such storage of video frames by the conventional video transcoding system impractical, if not impossible.

It would therefore be desirable to have improved systems and methods of transcoding video bitstreams that avoid the drawbacks of conventional video transcoding systems.

BRIEF SUMMARY OF THE INVENTION

These are other objects can be accomplished, in accordance with the present application, by systems and methods of transcoding video bitstreams that employ highly efficient look-ahead approaches to video transcoding. Such systems and methods of transcoding video bitstreams are configured to operate in the pixel domain, making successive adjustments to estimates of the coding complexity of video frames in input video bitstreams, and employing the adjusted estimates of the coding complexity in rate control functions to provide improved bit allocations for video frames in transcoded output video bitstreams, thereby enhancing overall perceptual quality.

In accordance with one aspect, a system for transcoding video bitstreams (also referred to herein as a/the "video transcoding system") includes a bitstream analyzer having a data collection component and a coding complexity estimation component, a video decoder, and a video encoder. In accordance with one exemplary aspect, the video transcoding system is configured to operate in the pixel domain, receiving an input video bitstream (also referred to herein as a/the "input bitstream") generated by an external video encoder that is separate from the disclosed video transcoding system. The external video encoder receives an input video sequence (also referred to herein as a/the "input sequence") comprising a plurality of video frames, encodes the input sequence according to a predetermined coding format, such as the H.263 coding format, the H.264 coding format, the MPEG-4 coding format, or any other suitable coding format, and sends the resulting input bitstream to the video transcoding system. The video transcoding system receives the input bitstream, and provides the input bitstream to the data collection component within the bitstream analyzer, and to the video decoder of the video transcoding system. In accordance with another exemplary aspect, the data collection component performs slice layer data collection, collecting, from the input bitstream, slice layer information such as the video frame size, the number of video frames to be buffered in the bitstream analyzer, the frame type (e.g., intra-coded or predictive), the number of prediction bits and the number of texture bits for each video frame, and/or any other suitable slice layer information. The data collection component also performs macroblock (also referred to herein as "MB") layer data collection, collecting, from the input bitstream, MB layer information such as the MB type, the quantization parameter (also referred to herein as "QP") used to encode the MB, the number of prediction bits and the number of texture bits in each MB, and/or any other suitable MB layer information. The data collection component is operative to collect such slice layer information and MB layer information from the input bitstream, and to provide the collected information to the coding complexity estimation component within the bitstream analyzer.

The coding complexity estimation component is operative to analyze, using a coding complexity estimation technique, the slice layer information and the MB layer information provided by the data collection component, thereby generating an estimate of the coding complexity (also referred to herein as "frame complexity") of each video frame in the input bitstream. The coding complexity estimation component is operative to provide such estimates of the frame complexity to the video encoder, which employs the estimates of the frame complexity in a rate control function to adapt the video transcoding system to the network environment in which the system is employed. Specifically, the video decoder is operative to read the plurality of video frames in the input bitstream, to decode the plurality of video frames, and to provide the decoded video frames to the video encoder, which implements the rate control function to allocate bits to the respective video frames in a transcoded output video bitstream (also referred to herein as a/the "transcoded output bitstream").

The coding complexity estimation technique used by the coding complexity estimation component includes a coding complexity estimation function operative to receive the slice layer information and the MB layer information collected from the input bitstream by the data collection component, and to provide, to an input quality adjustment function, an initial estimate of the frame complexity of each video frame in the input bitstream based, at least in part, on the quantization parameter, QP, used to generate the input bitstream, and the coding bits included in the input bitstream. The input quality adjustment function is one of a plurality of functions for adjusting the initial estimates of the frame complexity generated by the coding complexity estimation function. In accordance with another exemplary aspect, the plurality of functions for adjusting the initial estimates of the frame complexity include the input quality adjustment function, a temporal distance adjustment function, a constant bit rate (CBR) adjustment function, and a perceptual quality adjustment function. The perceptual quality adjustment function provides the adjusted estimate of the frame complexity of each video frame to the video encoder, which employs the adjusted estimates of the frame complexity in the rate control function to provide improved bit allocations for video frames in the transcoded output bitstream, thereby enhancing overall perceptual quality.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIGS. 7a and 7b are diagrams of exemplary parameters for use in the exemplary piecewise linear approach of FIG. 6a;

DETAILED DESCRIPTION OF THE INVENTION

Systems and methods of transcoding video bitstreams are disclosed that employ highly efficient look-ahead approaches to video transcoding. In accordance with the disclosed systems and methods, video transcoding is performed in the pixel domain using a coding complexity estimation technique for making successive adjustments to estimates of the coding complexity of video frames in input video bitstreams. The disclosed systems and methods employ the adjusted estimates of the coding complexity of the video frames to provide improved bit allocations for the video frames in transcoded output video bitstreams, thereby enhancing overall perceptual quality.

Figure 1:
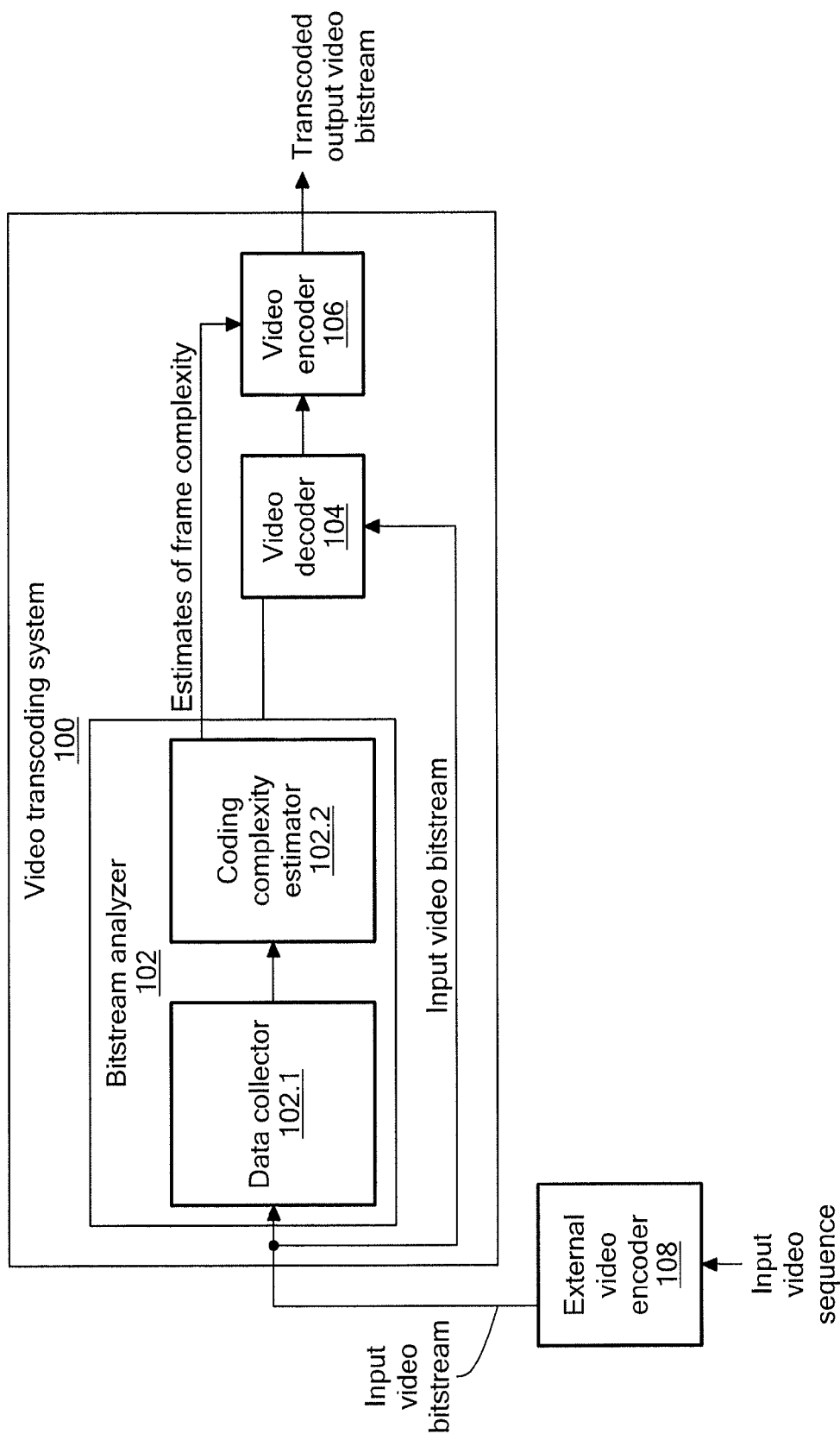
FIG. 1 is a block diagram of an exemplary video transcoding system in accordance with an exemplary embodiment of the present application.

FIG. 1 depicts an illustrative embodiment of an exemplary video transcoding system 100, in accordance with the present application. The video transcoding system 100 includes a bitstream analyzer 102, a video decoder 104, and a video encoder 106. Further, the bitstream analyzer 102 includes a data collector 102.1 and a coding complexity estimator 102.2. In accordance with the illustrative embodiment of FIG. 1, the video transcoding system 100 is configured to operate in the pixel domain, receiving an input video bitstream (also referred to herein as the "input bitstream") generated by an external video encoder 108 that is separate from the video transcoding system 100. Specifically, the external video encoder 108 receives an input video sequence (also referred to herein as the "input sequence") comprising a plurality of video frames, encodes the input sequence according to a predetermined coding format (e.g., the H.263 coding format, the H.264 coding format, the MPEG-4 coding format, or any other suitable coding format), and sends the resulting input bitstream to the video transcoding system 100. The video transcoding system 100 receives the input bitstream, and provides the input bitstream to the data collector 102.1 within the bitstream analyzer 102, and to the video decoder 104 of the video transcoding system 100.

It is noted that the data collector 102.1 can incorporate a predetermined number of video frames of delay in the input bitstream. For example, the data collector 102.1 may incorporate 300 video frames of delay, or any other suitable number of video frames of delay. Moreover, the data collector 102.1 performs slice layer data collection, collecting, from the input bitstream, slice layer information such as the video frame size, the number of video frames to be buffered in the bitstream analyzer 102, the frame type (e.g., intra-coded or predictive), the number of prediction bits and the number of texture bits for each video frame, and/or any other suitable slice layer information. The data collector 102.1 also performs macroblock (also referred to herein as "MB") layer data collection, collecting, from the input bitstream, MB layer information such as the MB type, the quantization parameter (also referred to herein as "QP") used to encode each MB, the number of prediction bits and the number of texture bits in each MB, and/or any other suitable MB layer information. The data collector 102.1 is operative to collect such slice layer information and MB layer information from the input bitstream, and to provide the collected information to the coding complexity estimator 102.2 within the bitstream analyzer 102.

In further accordance with the illustrative embodiment of FIG. 1, the coding complexity estimator 102.2 is configured to include at least one processor operative to execute at least one program out of at least one memory to analyze, using an exemplary coding complexity estimation technique 200 (see FIG. 2), the slice layer information and the MB layer information provided by the data collector 102.1, thereby generating an estimate of the coding complexity (also referred to herein as "frame complexity," or "$C_F$") of each video frame in the input bitstream. The coding complexity estimator 102.2 is operative to provide such estimates of the frame complexity, $C_F$, to the video encoder 106, which employs the estimates of the frame complexity, $C_F$, in a rate control function to adapt the video transcoding system 100 to the network environment in which the system is employed. It is noted that the video encoder 106 can implement a slice layer rate control function, an MB layer rate control function, or any other suitable type of rate control function. For example, the video encoder 106 may employ the rate control function described in co-pending U.S. patent application Ser. No. 12/497,110 filed Jul. 2, 2009, entitled A BITRATE CONTROL ALGORITHM FOR VIDEO TRANSCODING SYSTEMS, which is assigned to the same assignee of the present application, and which is incorporated herein by reference in its entirety. Moreover, the video decoder 104 is operative to read the plurality of video frames in the input bitstream, to decode the plurality of video frames, and to provide the decoded video frames to the video encoder 106, which implements the rate control function to allocate bits to the respective video frames in a transcoded output video bitstream (also referred to herein as the "transcoded output bitstream").

The disclosed coding complexity estimation technique 200 is described below with reference to FIG. 2. It is noted that the coding complexity estimation technique 200 of FIG. 2 can be performed by the coding complexity estimator 102.2 within the bitstream analyzer 102 of the video trancoding system 100 (see FIG. 1). The coding complexity estimation technique 200 includes a coding complexity estimation function 202 operative to receive the slice layer information and the MB layer information collected from the input bitstream by the data collector 102.1, and to provide an initial estimate of the frame complexity, $C_F$, of each video frame in the input bitstream to an input quality adjustment function 204. The input quality adjustment function 204 is one of a plurality of exemplary functions for adjusting the initial estimates of the frame complexity, $C_F$, generated by the coding complexity estimation function 202. In accordance with the illustrative embodiment of FIG. 2, the plurality of exemplary functions for adjusting the initial estimates of the frame complexity, $C_F$, include, but are not limited to, the input quality adjustment function 204, a temporal distance adjustment function 206, a constant bit rate (CBR) adjustment function 208, and a perceptual quality adjustment function 210. It is noted that any other suitable function or functions for adjusting the estimates of the frame complexity, $C_F$, may be employed in addition to, or in place of, some or all of the exemplary functions 204, 206, 208, and 210. The perceptual quality adjustment function 210 provides the adjusted estimate of the frame complexity, $C_F$, of each video frame to the video encoder 106 of the video transcoding system 100.

The coding complexity estimation function 202, and the plurality of exemplary functions 204, 206, 208, 210 (see FIG. 2) for adjusting the initial estimates of the frame complexity, $C_F$, generated by the coding complexity estimation function 202, are described below with reference to a plurality of exemplary input video sequences. The coding complexity estimation function 202 estimates the frame complexity, $C_F$, as coding bits that the external video encoder 108 (see FIG. 1) would generate while encoding a video frame in an input sequence using a predetermined reference quantization parameter (also referred to herein as "$QP_{ref\_est}$") instead of the quantization parameter (QP) used to encode the corresponding input bitstream in the video encoder 106. In accordance with the present application, the plurality of exemplary input sequences are encoded by the external video encoder 108 using a predetermined range of quantization parameters (QPs), and subsequently transcoded by the video encoder 106 (see FIG. 1) of the video transcoding system 100. Further, because the estimates of the frame complexity, $C_F$, generated by the coding complexity estimator 102.2 are used in the video encoder 106, the reference quantization parameter, $QP_{ref\_est}$, is preferably set to be equal to a value that is close to the value of the quantization parameter, QP, used in the video encoder 106. To achieve this, the $QP_{ref\_est}$ value is calculated as the average QP of the previously encoded video frames in the video encoder 106 in the case of constant bit rate (CBR) coding, and is configured as a fixed QP value in the case where a constant QP is used in the video encoder 106. For example, the predetermined range of QPs used by the external video encoder 108, which may comprise an external H.264 video encoder, may range from about 0 to 51, or any other suitable range of QPs. Further, the reference quantization parameter $QP_{ref\_est}$ may be set to be equal to 32, or to any other suitable QP value. Moreover, the exemplary input sequences may comprise common intermediate format (CIF) video sequences, concatenated video graphics array (VGA) video sequences, and/or any other suitable type of video sequences, including a plurality of video clips covering diverse types of video content. Such video sequences included in the exemplary input sequences may each have about 300 to 400 video frames of varying complexity, or any other suitable number of video frames having any other suitable level(s) of complexity.

Coding Complexity Estimation Function

As discussed above, the video encoder 106 of the video transcoding system 100 (see FIG. 1) employs estimates of the frame complexity, $C_F$, generated by the coding complexity estimator 102.2 in a rate control function to allocate bits to respective video frames in the transcoded output bitstream. It is noted that, whereas the external video encoder 108 encodes the exemplary input video sequences using the predetermined range of QPs (e.g., from about 0 to 51), the external video encoder 108 typically generates more coding bits (e.g., texture bits and prediction bits) as the complexity of the video frames in the input sequences increases. Moreover, for a given bit allocation, the external video encoder 108 typically uses larger quantization parameters, QPs, as the complexity of the respective video frames in the exemplary input sequences increases. For at least these reasons, the coding complexity estimation function 202 is operative to estimate the frame complexity, $C_F$, based on the coding bits (e.g., the texture bits and the prediction bits) generated for the respective video frames, and the quantization parameter, QP, used to encode the respective video frames. For example, in the case of constant bit rate (CBR) coding, the quantization parameter, QP, used to encode a current video frame in the input bitstream can be set to be equal to the average of the quantization parameters, QPs, used to encode all of the macroblocks, MBs, in the current video frame. Moreover, in the case of constant QP coding, the quantization parameter, QP, can be set to a predetermined fixed value.

In accordance with the exemplary embodiment of FIG. 2, the frame complexity, $C_F$, generated by the coding complexity estimation function 202 for the current video frame can be represented as the sum of the complexities for all of the macroblocks, MBs, in the respective video frame, as follows, $$C_F(QP) = \sum_{i=1}^{num\_MB} C_{MB[i]}(QP), \qquad (1)$$

where "i" corresponds to a macroblock (MB) index ranging from 1 to the total number of MBs, num_MB, in the respective video frame, "$MB_{[i]}$" is the macroblock corresponding to MB index i, "$C_{MB\ [i]}$" represents the complexity of the macroblock, $MB_{[i]}$, and "QP" represents the quantization parameter used to encode the respective video frame. Further, the complexity, $C_{MB\ [i]}$, of the macroblock, $MB_{[i]}$, can be expressed as:

$$C_{MB[i]}(QP) = \alpha_{MB[i]}(QP, T_{MB[i]}) * T_{MB[i]} + \beta_{MB[i]}(QP, P_{MB[i]}) * P_{MB[i]} \qquad (2)$$

where "$T_{MB[i]}$" represents the texture bits included in the macroblock, $MB_{[i]}$, "$P_{MB[i]}$" represents the prediction bits included in the macroblock, $MB_{[i]}$, "$\alpha_{MB[i]}(QP,T_{MB[i]})$" is a weighting parameter for the texture bits, $T_{MB[i]}$, and "$\beta_{MB[i]}(QP,P_{MB[i]})$" is a weighting parameter for the prediction bits, $P_{MB[i]}$. It is noted that the weighting parameters, $\alpha_{MB[i]}(QP, T_{MB[i]})$ and $\beta_{MB[i]}(QP,P_{MB[i]})$, for the texture bits, $T_{MB[i]}$, and the prediction bits, $P_{MB[i]}$, respectively, are employed in equation (2) above because the texture bits, $T_{MB[i]}$, and the prediction bits, $P_{MB[i]}$, can have significantly different characteristics.

In further accordance with the illustrative embodiment of FIG. 2, the weighting parameters, $\alpha_{MB[i]}(QP,T_{MB[i]})$ and $\beta_{MB[i]}(QP,P_{MB[i]})$, can be estimated as follows. Assuming that the weighting parameters, $\alpha_{MB[i]}(QP,T_{MB[i]})$ and $\beta_{MB[i]}$ (QP,$P_{MB[i]}$), are the same for all of the macroblocks, $MB_{[i]}$, in the current video frame, the frame complexity, $C_F$, can be expressed as:

$$\begin{aligned} C_F(QP) &= \sum_{i=1}^{num\_MB} (\alpha_{MB[i]}(QP, T_{MB[i]}) * T_{MB[i]} + \\ &\quad \beta_{MB[i]}(QP, P_{MB[i]}) * P_{MB[i]}) \\ &= \alpha_F(QP) \sum_{i=1}^{num\_MB} T_{MB[i]} + \beta_F(QP) \sum_{i=1}^{num\_MB} P_{MB[i]} \\ &= \alpha_F(QP) * T_F + \beta_F(QP) * P_F \end{aligned} \qquad (3)$$

where "$T_F$" and "$P_F$" represent the texture bits and prediction bits, respectively, for the respective video frame, and "$\alpha_F(QP)$" and "$\beta_F(QP)$" represent the weighting parameters for the texture bits, $T_F$, and the prediction bits, $P_F$, respectively, for the respective video frame.

The weighting parameters $\alpha_F(QP)$ and $\beta_F(QP)$ for the respective video frame are trained for different QPs so that the frame complexity, $C_F(QP)$, in equation (3) above becomes close to the frame complexity, $C_F\mathrm{QP}_{ref\_est}$) where $$\alpha_F(QP_{ref\_est}) = \beta_F(QP_{ref\_est}) = 1.0. \qquad (4)$$

Figure 3A:
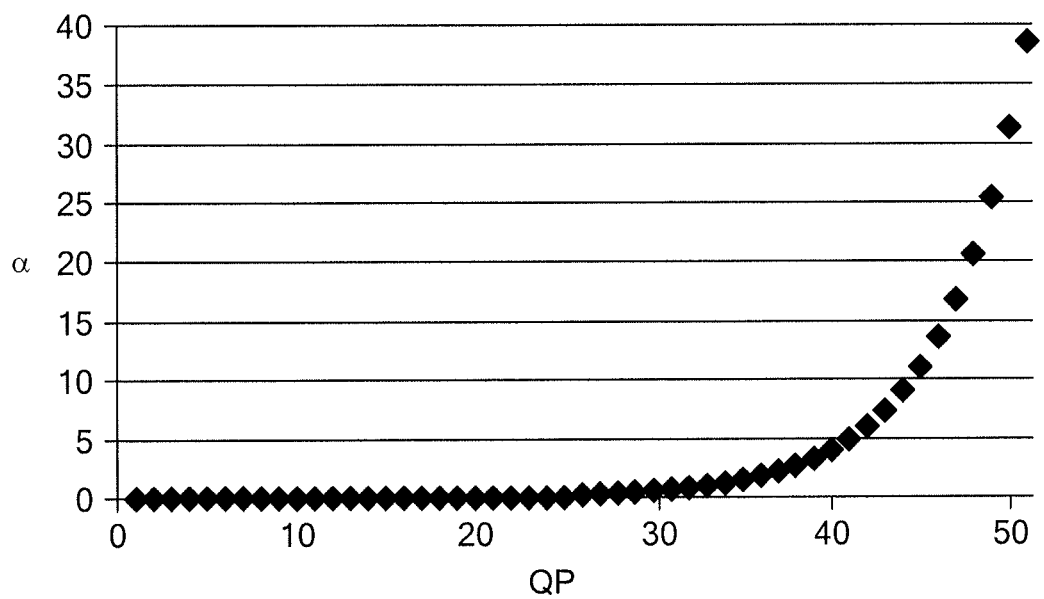
FIGS. 3a and 3b are diagrams of exemplary values of weighting parameters for coding bits from an input video bitstream, for use in the exemplary coding complexity estimation function of FIG. 2.
Figure 3B:
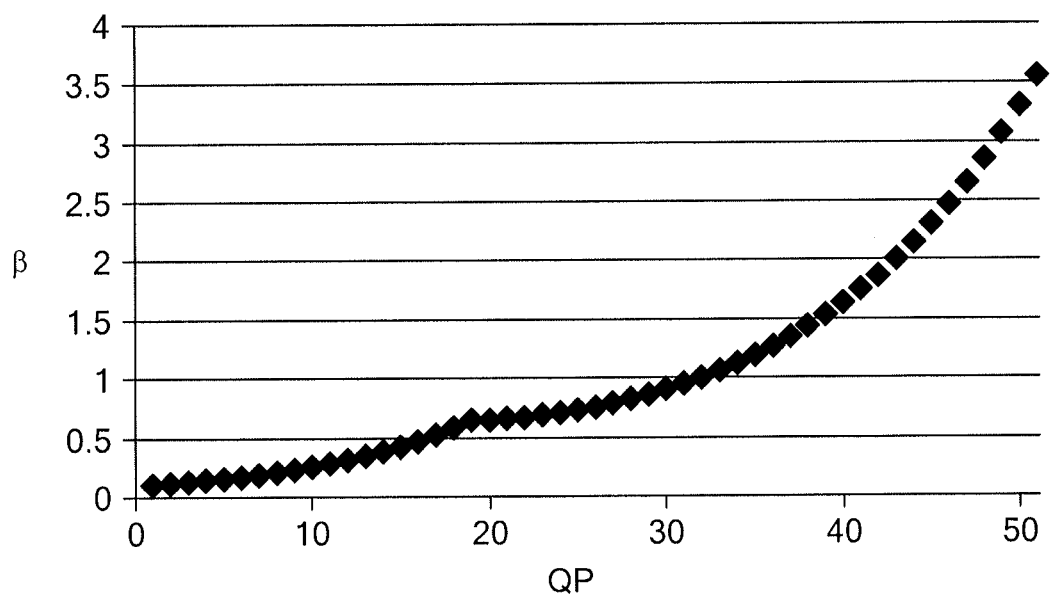

FIG. 3a depicts, for $QP_{ref\_est}$ being equal to 32, exemplary values of the weighting parameter, $\alpha_F(QP)$, with reference to the quantization parameters, QPs, ranging from 0 to 51. Further, FIG. 3b depicts, for $QP_{ref\_est}$ being equal to 32, exemplary values of the weighting parameter, $\beta_F(QP)$, with reference to the quantization parameters, QPs, ranging from 0 to 51.

Figure 4:
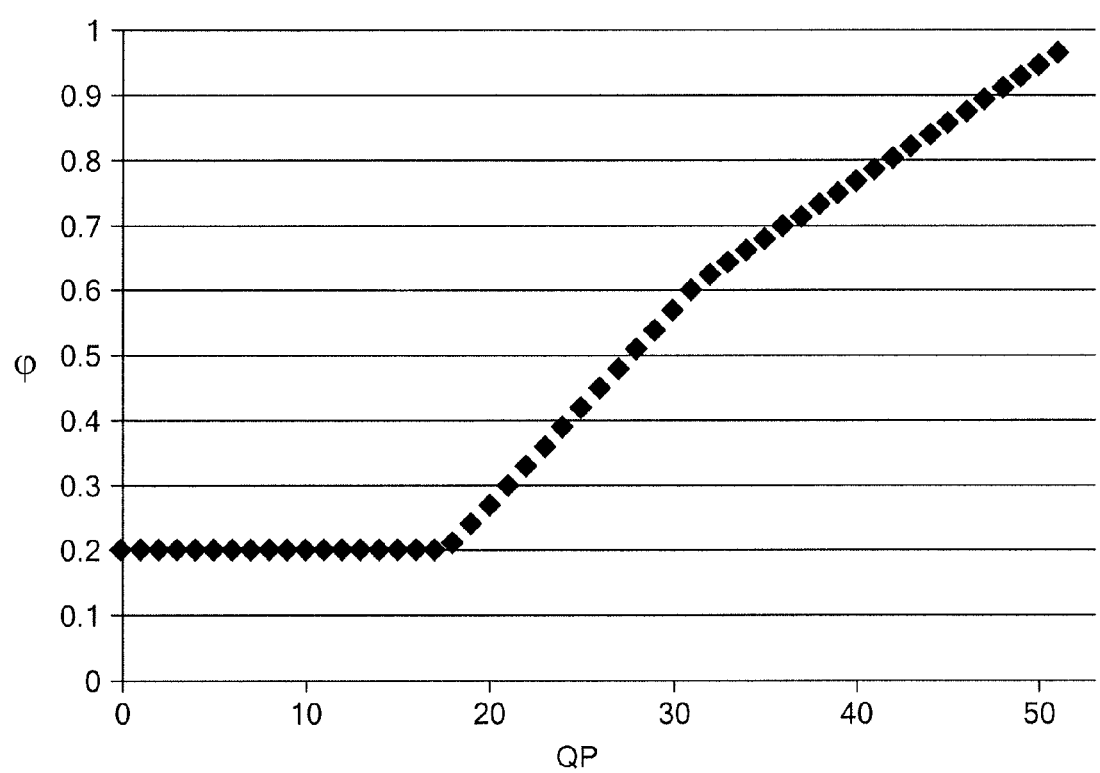
FIG. 4 is a diagram of exemplary parameters for adjusting the values of the weighting parameters for the coding bits from the input video bitstream, for use in the exemplary coding complexity estimation function of FIG. 2.

It is noted that a user of the video transcoding system 100 may have little or no control over the external video encoder 108 that provides the input bitstream to the video transcoding system 100. Because different video encoders may employ different optimization and motion estimation techniques, the texture bits, $T_F$, and the prediction bits, $P_F$, generated by the video encoders for the respective video frames in the input bitstream may be different from one video encoder to another. To account for such diversity in video encoders, any dependency on a specific video encoder can be essentially removed from the disclosed coding complexity estimation technique 200 by adjusting the weighting parameters, $\alpha_F(QP)$ and $\beta_F(QP)$, using a parameter, "$\phi$," as follows, $$\alpha_F(QP) = \begin{cases} \alpha_F(QP) * \left(1 + \frac{P_F}{T_F}\right) * (1 - \phi), & \text{for } \left(\frac{P_F}{P_F + T_F} > \phi\right) \\ \alpha_F(QP), & \text{(otherwise)} \end{cases} \qquad (5)$$

$$\beta_F(QP) = \begin{cases} \beta_F(QP) * \left(1 + \frac{T_F}{P_F}\right) * \phi, & \text{for } \left(\frac{P_F}{P_F + T_F} > \phi\right) \\ \beta_F(QP), & \text{(otherwise)} \end{cases},$$

where the parameter, $\phi$, can be adapted to the video encoder characteristics from the encoding history. In this way, the actual prediction bits can be distinguished from prediction bits resulting from the use of smaller partition prediction modes, such as the 4×4 motion prediction mode or any other suitable prediction mode. FIG. 4 depicts, for $QP_{ref\_est}$ being equal to 32, exemplary values of the parameter, $\phi$, with reference to the quantization parameters, QPs, ranging from 0 to 51.

Figure 5:
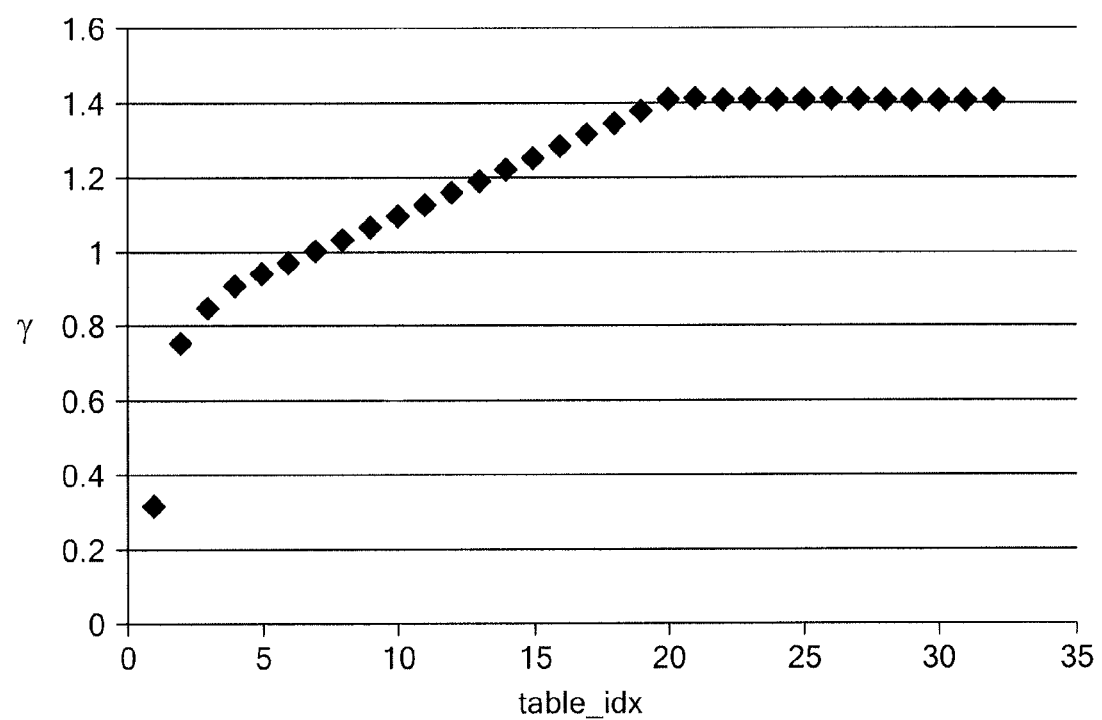
FIG. 5 is a diagram of exemplary parameters for adjusting values of the coding bits from the input video bitstream, for use in the exemplary coding complexity estimation function of FIG. 2.
Figure 7A:
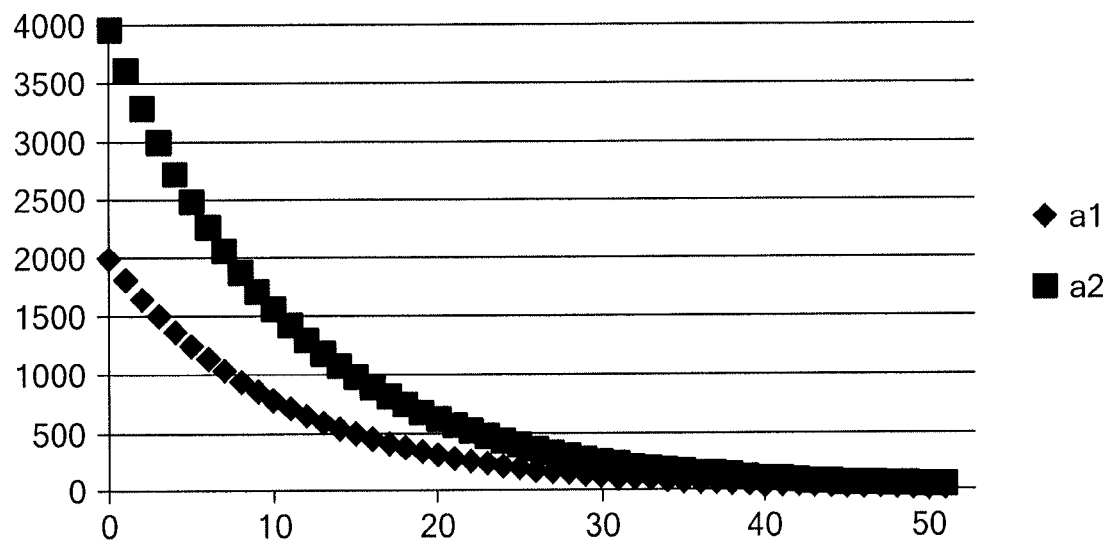

It is further noted that, if a macroblock, MB, in a respective video frame has a small number of texture and prediction bits after being encoded by the external video encoder 108 using a relatively small quantization parameter, QP (e.g., QP=20), then the probability increases that the MB will be skipped when the MB is encoded by the same external video encoder 108 using a larger reference quantization parameter, $QP_{ref\_est}$ (e.g., $QP_{ref\_est}$=32). It follows that errors in the estimates of the frame complexity, $C_F$, of the respective video frames may increase if the skip probabilities of the macroblocks, MBs, included in the video frames are not taken into account, especially if the quantization parameter, QP, used by the external video encoder 108 to encode the video frames is different from the reference quantization parameter, $QP_{ref\_est}$. For at least this reason, the texture bits, $T_{MB[i]}$, included in the macroblock, MB[i], are adjusted, as follows, $$T_{MB[i]} = T_{MB[i]} * \gamma(QP, T_{MB}, P_{MB}), \quad (6)$$

where "$\gamma(QP, T_{MB[i]}, P_{MB[i]})$" is a parameter that is dependent on the quantization parameter, QP, the texture bits, $T_{MB[i]}$, and the prediction bits, $P_{MB[i]}$. FIG. 5 depicts exemplary values of the parameter, $\gamma(QP, T_{MB[i]}, P_{MB[i]})$, with reference to a range of values designated as "table_idx," which can be determined as follows, $$\text{table\_idx} = \begin{cases} \hat{P}_{MB[i]}, & \text{for } (T_{MB[i]} < a_1) \\ \hat{P}_{MB[i]} + 2*(T_{MB[i]}/a_1 - 1), & \text{(otherwise)} \end{cases}, \quad (7)$$

where $$\hat{P}_{MB[i]} = \begin{cases} 8, & \text{for } (P_{MB[i]} < 8) \\ P_{MB[i]}, & \text{(otherwise)} \end{cases}, \quad (8)$$

and "$a_1$" is a parameter that is dependent on the quantization parameter, QP. FIG. 7a illustrates exemplary values of the parameter, $a_1$, with reference to the quantization parameters, QPs, ranging from 0 to 51.

Figure 6A:
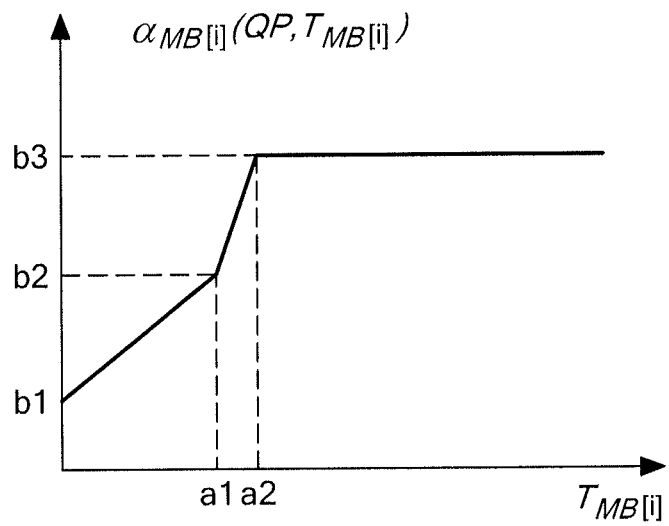
FIGS. 6a and 6b are diagrams illustrating exemplary piecewise linear approaches for adjusting the values of the weighting parameters for the coding bits from the input video bitstream, for use in the exemplary coding complexity estimation function of FIG. 2.

To estimate the frame complexity, $C_F$, with increased accuracy, the weighting parameters, $\alpha_F(QP)$ and $\beta_F(QP)$, can be adjusted for each of the macroblocks, MBs, in the respective video frame. For example, with reference to FIG. 6a, to obtain the weighting parameter, $\alpha_{MB[i]}(QP, T_{MB[i]})$, using a piecewise linear approach, the expressions below may be employed, $$\alpha_{MB[i]}(QP, T_{MB[i]}) = \quad (9)$$

$$\begin{cases} \frac{b2-b1}{a1} * T_{MB[i]} + b1 & \text{for } (T_{MB[i]} < a1) \\ \frac{b3-b2}{a2-a1} * T_{MB[i]} + \frac{(a2*b2 - a1*b3)}{a2-a1} & \text{for } (a1 \le T_{MB[i]} < a2) \\ b3 & \text{(otherwise)} \end{cases}.$$

Figure 7B:
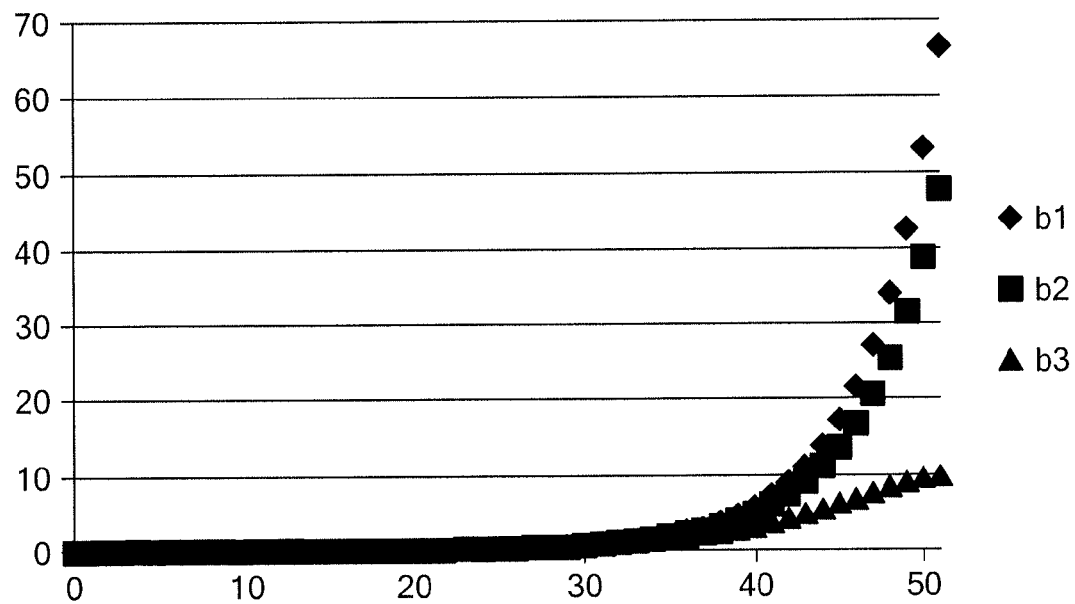

In equation (9) above, the parameters, "a1" and "a2," can be obtained using the diagram depicted in FIG. 7a, which illustrates exemplary values of the parameters, a1 and a2, with reference to the quantization parameters, QPs, ranging from 0 to 51. Further, the parameters, "b1," "b2," and "b3," in equation (9) above can be obtained using the diagram depicted in FIG. 7b, which illustrates exemplary values of the parameters, b1, b2, and b3, with reference to the quantization parameters, QPs, ranging from 0 to 51.

Figure 6B:
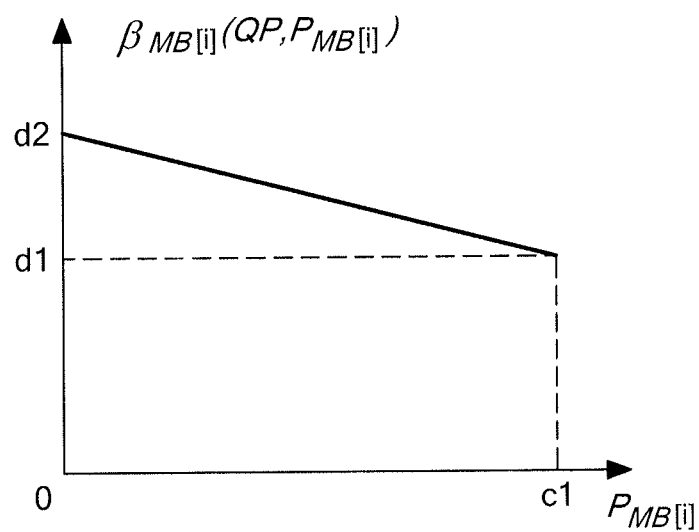

Moreover, with reference to FIG. 6b, to obtain the weighting parameter, $\beta_{MB[i]}(QP, P_{MB[i]})$, using the piecewise linear approach noted above, the expressions below may be employed, $$\beta_{MB[i]}(QP, P_{MB[i]}) = \quad (10)$$

$$\begin{cases} \left(\frac{d_1-d_2}{c_1} * P_{MB[i]} + d_2\right) * \beta(QP) & \text{(otherwise)} \\ d_1 * \beta(QP) & \text{for } (P_{MB[i]} > c_1) \end{cases}.$$

By way of example, in equation (10) above, the parameters "c1," "d1" and "d2," may be set to be equal to 512, 0.75, and 1.05, respectively, or to any other suitable values.

Input Quality Adjustment Function

Figure 2:
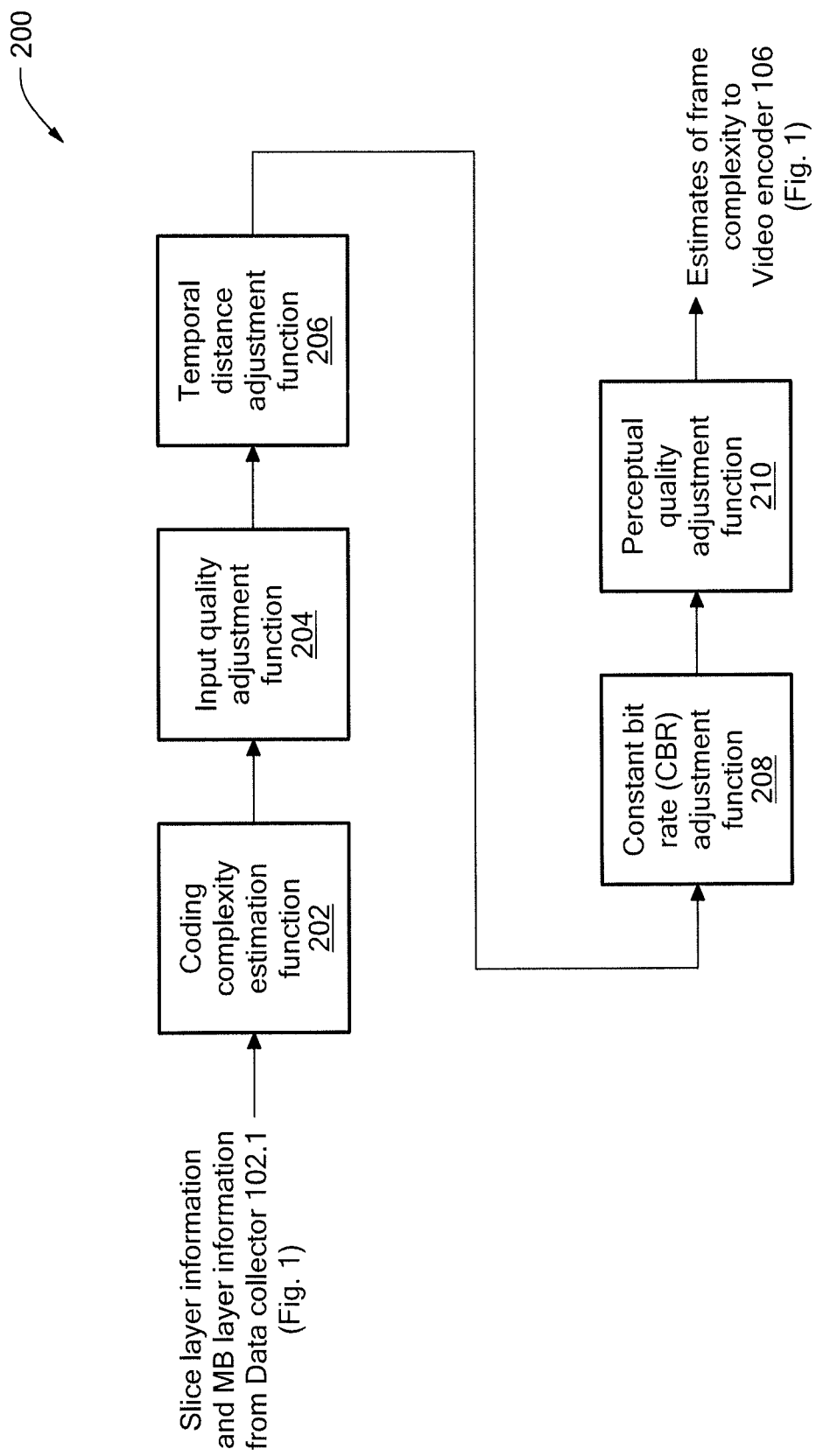
FIG. 2 is a functional block diagram of an exemplary coding complexity estimation technique employed by the exemplary video transcoding system of FIG. 1, the coding complexity estimation technique including an exemplary coding complexity estimation function, an exemplary input quality adjustment function, an exemplary temporal distance adjustment function, an exemplary constant bit rate (CBR) adjustment function, and an exemplary perceptual quality adjustment function.

As described above, the input quality adjustment function 204 (see FIG. 2) is one of a plurality of functions for adjusting the initial estimates of the frame complexity, $C_F$, generated by the coding complexity estimation function 202 (see FIG. 2). In accordance with the exemplary embodiment of FIG. 2, the input quality adjustment function 204 adjusts the initial estimates of the frame complexity, $C_F$, based on the quantization parameter, QP, used by the external video encoder 108. Specifically, the input quality adjustment function 204 employs a parameter, "$\delta(QP)$", to adjust each initial estimate of the frame complexity, $C_F$, as follows, $$C_F = C_F * \delta(QP). \quad (11)$$

Figure 8:
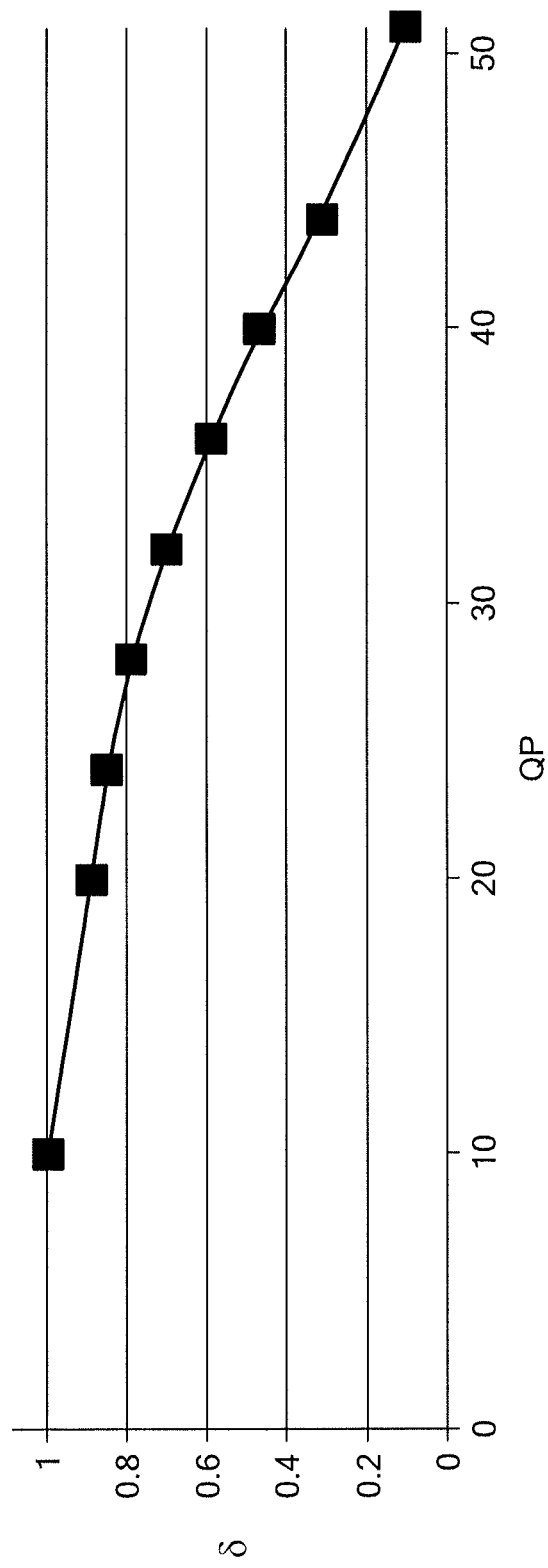
FIG. 8 is a diagram of exemplary parameters for adjusting initial estimates of the coding complexity of video frames from the input video bitstream, for use in the exemplary input quality adjustment function of FIG. 2.

FIG. 8 illustrates exemplary values of the parameter, $\delta(QP)$, with reference to the quantization parameters, QPs, ranging from 0 to 51.

Temporal Distance Adjustment Function

Figure 9:
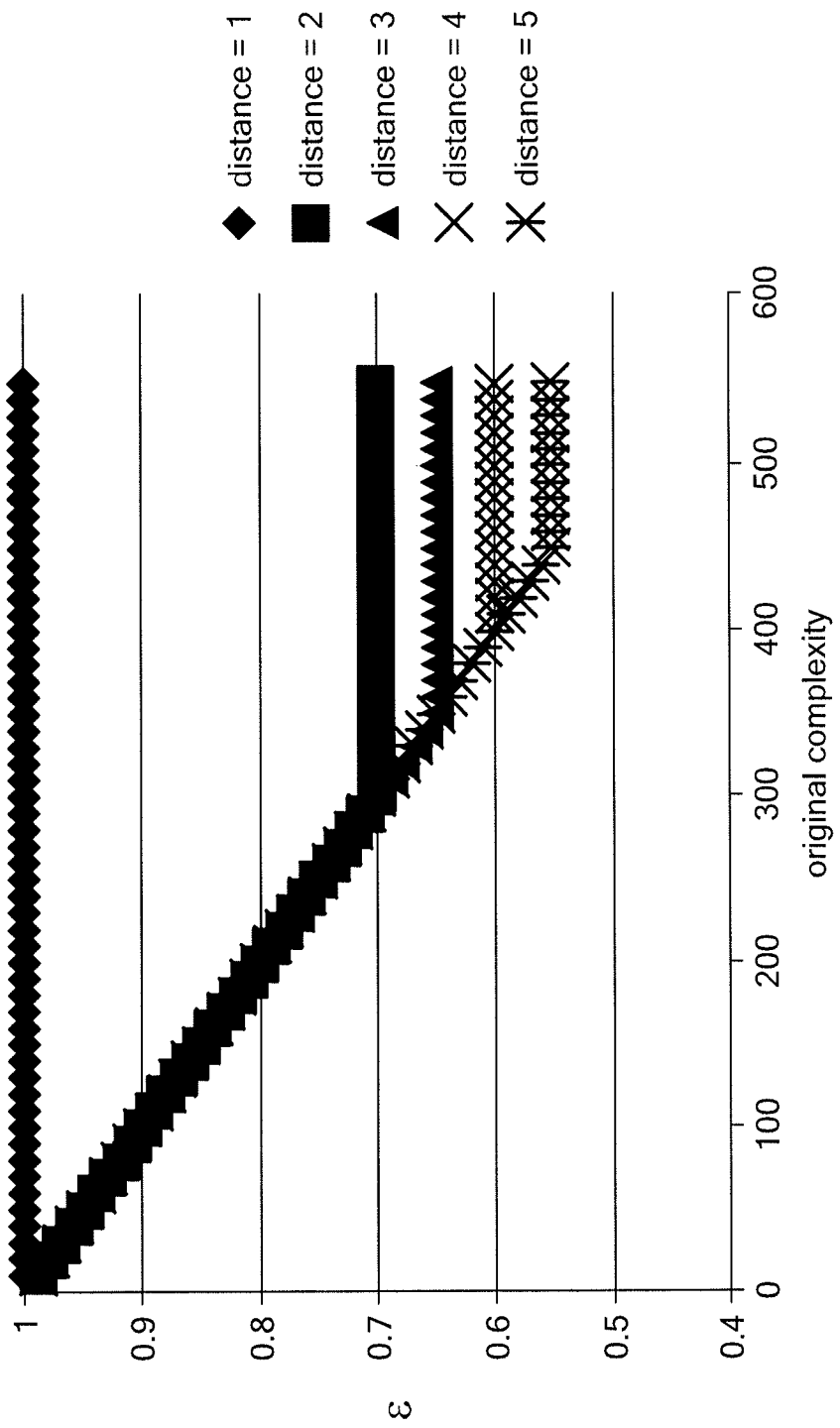
FIG. 9 is a diagram of exemplary parameters for normalizing the estimates of the coding complexity of the video frames from the input video bitstream, for use in the exemplary temporal distance adjustment function of FIG. 2.

It is noted that the estimation of the frame complexity, $C_F$, described above has not taken into account the temporal distance between a current video frame and a predetermined reference frame for the current video frame, which is used to encode the current video frame in the external video encoder 108. In general, as the temporal distance between the current video frame and its reference frame increases, the temporal correlation between the respective video frames decreases, typically resulting in the use of an increased number of bits within the external video encoder 108. However, this does not necessarily lead to an increase in the frame complexity, $C_F$, of the current video frame. In accordance with the exemplary embodiment of FIG. 2, the temporal distance adjustment function 206 normalizes the frame complexity, $C_F$, by the temporal distance between the current video frame and its reference frame to increase the accuracy of the estimate of the frame complexity, $C_F$. Specifically, the temporal distance adjustment function 206 employs a parameter, "$\epsilon$(distance, org_complexity)," to normalize the frame complexity, $C_F$, as follows, $$C_F = C_F * \epsilon(\text{distance}, \text{org\_complexity}) \quad (12)$$

where "distance" corresponds to the temporal distance between the current video frame and its reference frame, and "org_complexity" corresponds to the original complexity of the current video frame. FIG. 9 illustrates exemplary values of the parameter, e (distance, org_complexity), with reference to exemplary values of the original complexity of the current video frame, and with reference to exemplary values of the temporal distance between the current video frame and its reference frame.

Constant Bit Rate (CBR) Adjustment Function

It is further noted that, in a constant bit rate (CBR) environment, video encoders may use different quantization parameters, QPs, to encode different video frames in an input video sequence. Further, such video encoders may employ predetermined reference frames that have different associated levels of quality. Accordingly, in the CBR environment, a number of observations can be made, as follows.

Observation 1—The difference between a current video frame and its reference frame in the video encoder 106 typically increases as the difference between the quantization parameters, QPs, used by the external video encoder 108 to encode the respective video frames increases. As a result, if the same number of bits generated by the external video encoder 108 to encode the respective video frames were used to estimate the frame complexity, $C_F$, of a video frame of the predictive type (also referred to herein as the "P-frame"), then the frame complexity, $C_F$, of the P-frame would likely be underestimated.

Observation 2—If the quantization parameter, QP, used for generating the reference frame was smaller than the quantization parameter, QP, used to encode the current video frame in the external video encoder 108, then the number of bits generated by the external video encoder 108 for encoding the current video frame would likely be less than the number of bits that would have been generated if the quantization parameter, QP, was about equal to the quantization parameter, QP, used for generating the reference frame. As a result, if the same number of bits generated by the external video encoder 108 to encode the respective video frames were used to estimate the frame complexity, $C_F$, of a P-frame, then the frame complexity, $C_F$, of the P-frame would likely be underestimated.

Observation 3—If the quantization parameter, QP, used for generating the reference frame was larger than the quantization parameter, QP, used to encode the current video frame in the external video encoder 108, then the number of bits generated by the external video encoder 108 for encoding the current video frame would likely be greater than the number of bits that would have been generated if the quantization parameter, QP, was about equal to the quantization parameter, QP, used for generating the reference frame. As a result, if the same number of bits generated by the external video encoder 108 to encode the respective video frames were used to estimate the frame complexity, $C_F$, of a P-frame, then the frame complexity, $C_F$, of the P-frame would likely be overestimated.

Figure 10:
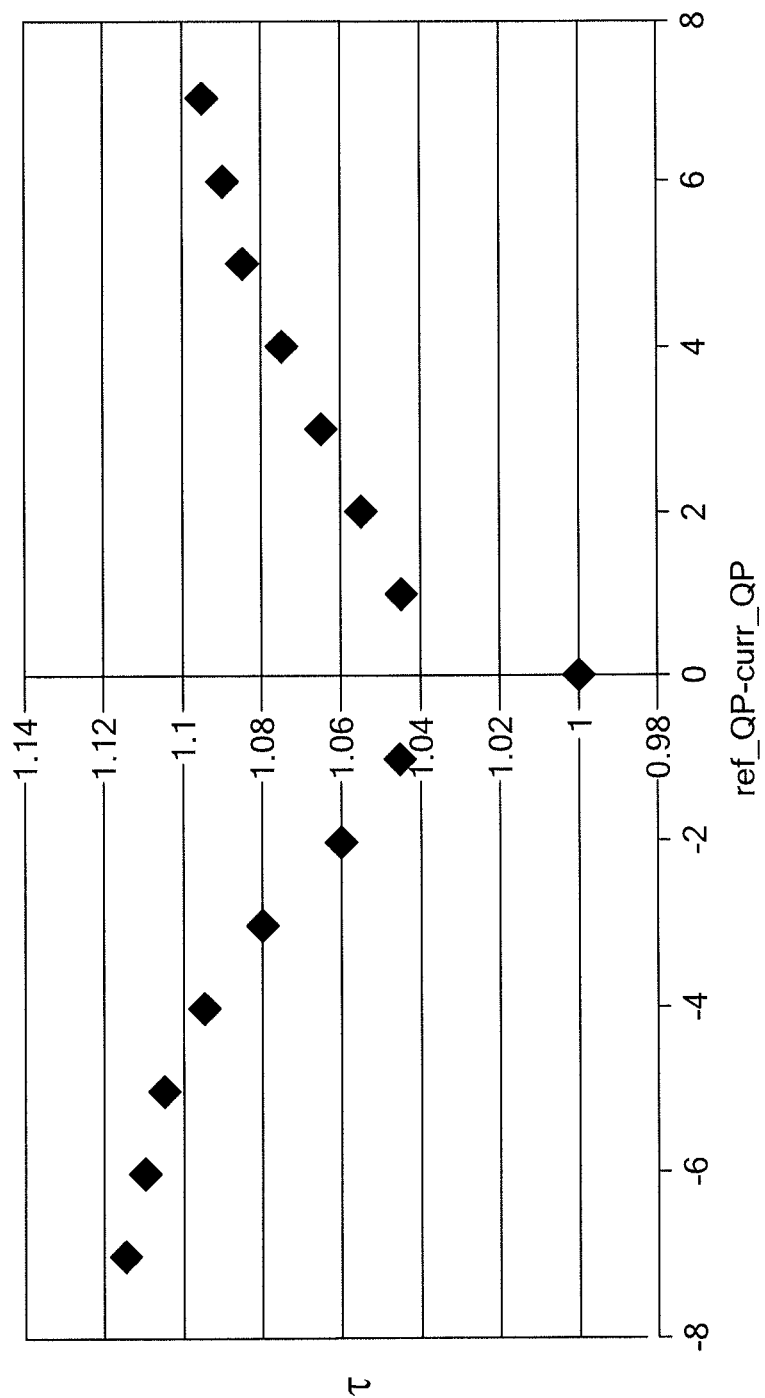
FIG. 10 is a diagram of exemplary parameters for adjusting the estimates of the coding complexity of the video frames from the input video bitstream, for use in the exemplary CBR adjustment function of FIG. 2.

Taking into account the three observations discussed above, the CBR adjustment function 208 adjusts the frame complexity, $C_F$, of P-frames using a parameter, "$\tau$" as follows, $$C_F = C_F * \tau, \quad (13)$$

where the parameter, $\tau$, is based on the difference between the quantization parameter used to generate the reference frame (also referred to herein as "ref_QP"), and the quantization parameter used to encode the current video frame (also referred to herein as "curr_QP"). FIG. 10 illustrates exemplary values of the parameter, $\tau$, with reference to a range of values for ref_QP, and with reference to a range of values for curr_QP.

It is also noted that the video encoder 106 of the video transcoding system 100 may employ different frame types (e.g., intra-coded, predictive) from those used by the external video encoder 108. For example, the external video encoder 108 may have encoded a video frame as an intra-coded frame (also referred to herein as an/the "I-frame"), and the video encoder 106 may determine that the video frame is to be encoded as a P-frame. Because the complexity of the I-frame generated by the external video encoder 108 may be significantly different from the complexity of the P-frame generated by the video encoder 106, the CBR adjustment function 208 adjusts the frame complexity, $C_F$, of the current P-frame based on the frame complexity, $C_F$, of the previous P-frame and the frame complexity, $C_F$, of the next P-frame, as follows, $$C_F(\text{current\_frame}) = {}^{15}\!/_{32} * C_F(\text{previous\_frame}) + {}^{1}\!/_{16} * C_F(\text{current\_frame}) + {}^{15}\!/_{32} * C_F(\text{next\_frame}) \quad (14)$$

where "$C_F(\text{current\_frame})$" represents the frame complexity, $C_F$, of the current P-frame, "$C_F(\text{previous\_frame})$" represents the frame complexity, $C_F$, of the previous P-frame, and "$C_F(\text{next\_frame})$" represents the frame complexity, $C_F$, of the next P-frame. It is noted that, in equation (14) above, the weights given to the previous P-frame, $C_F(\text{previous\_frame})$, the current P-frame, $C_F(\text{current\_frame})$, and the next P-frame, $C_F(\text{next\_frame})$, may be ${}^{15}\!/_{32}$, ${}^{1}\!/_{16}$, and ${}^{15}\!/_{32}$, respectively, or any other suitable weighting values.

Moreover, the external video encoder 108 may have encoded a video frame as a P-frame, and the video encoder 106 may determine that the video frame is to be encoded as an I-frame. For example, the external video encoder 108 may have failed to detect a scene change in a video sequence including the video frame and therefore encoded that video frame as a P-frame, while the video encoder 106 may have successfully detected the scene change and therefore encoded that video frame as an I-frame. In this case, the CBR adjustment function 208 estimates the frame complexity, $C_F$, of such an I-frame, as follows, $$I\_\text{complexity} = P\_\text{complexity} * \theta * \upsilon + I\_\text{complexity\_prev} * (1-\upsilon) \quad (15)$$

where "I_complexity" represents the frame complexity, $C_F$, of the current I-frame, "P_complexity" represents the frame complexity, $C_F$, of the corresponding P-frame, and "I_complexity_prev" represents the frame complexity, $C_F$, of the previous video frame encoded as the I-frame in the external video encoder 108. Further, "$\theta$" is a first parameter for use in adjusting the complexity of the corresponding P-frame, P_complexity, and "$\upsilon$" is a second parameter for use in weighing the complexity of the corresponding P-frame, P_complexity, and the complexity of the previous video frame encoded as the I-frame, I_complexity_prev. It is noted that the parameter, $\upsilon$, provides an indication of the reliability of the content of the previous I-frame. In accordance with the exemplary embodiment of FIG. 2, each of the parameters, $\theta$ and $\upsilon$, can be determined, from the encoding history, by a ratio of the intra-coded macroblocks, MBs, in the respective I-frames.

Perceptual Quality Adjustment Function

To enhance perceptual quality, the weighting parameters, $\alpha_{MB[i]}(QP, T_{MB[i]})$, $\beta_{MB[i]}(QP, P_{MB[i]})$ and $\alpha_F(QP)$, $\beta_F(QP)$, described above can be configured to allow more bits to be allocated to those video frames having associated levels of distortion that would likely be visually perceptible by a typical human user. Because the typical human user can visually detect distortion in simple scenes with relative ease, the perceptual quality adjustment function 210 is configured to increase the smaller frame complexity values, and to reduce the larger frame complexity values, using a parameter, "$\mu$," as follows.

$$C_F = C_F * \mu \quad (16)$$

Figure 11:
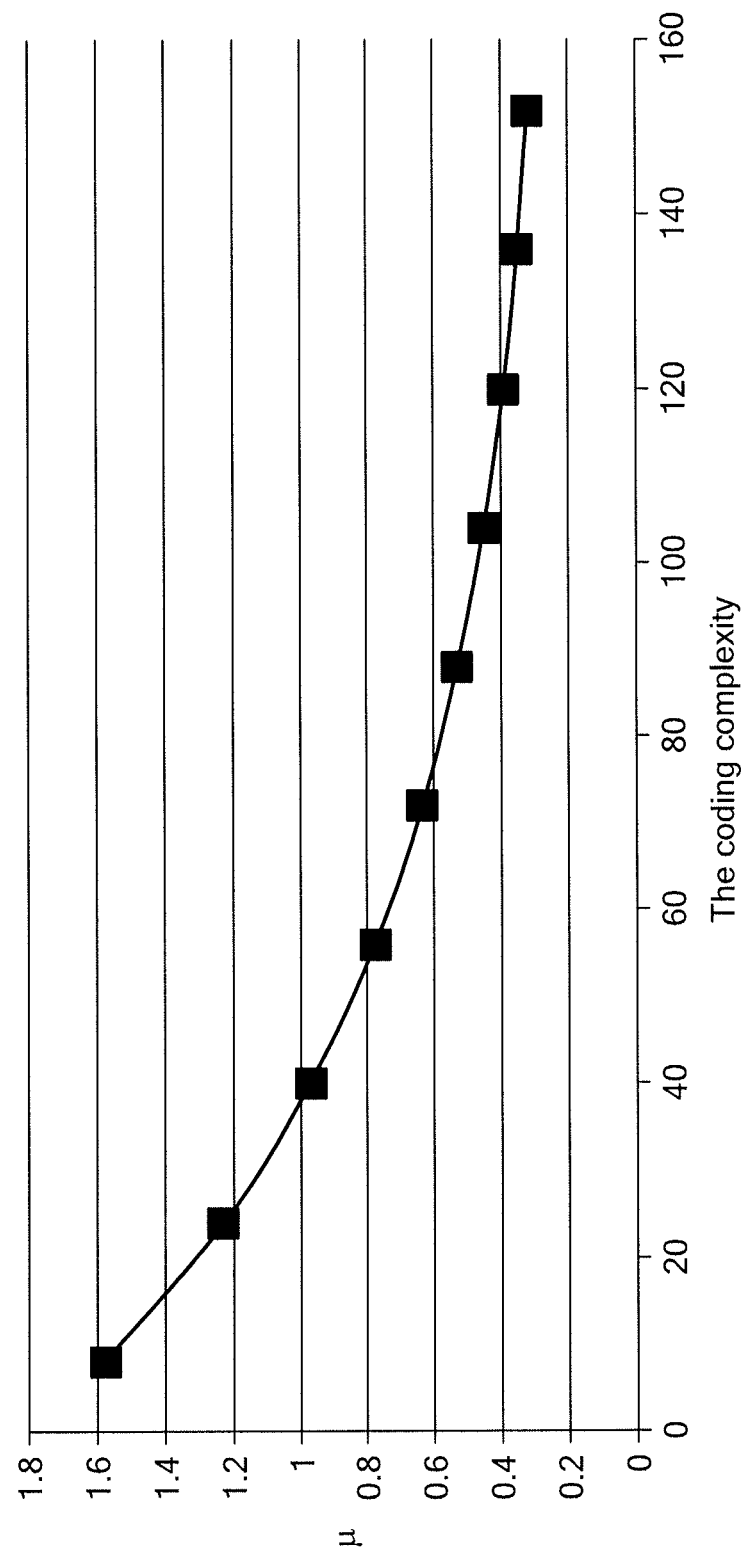
FIG. 11 is a diagram of exemplary parameters for increasing smaller estimates, and reducing larger estimates, of the coding complexity of the video frames from the input video bitstream, for use in the exemplary perceptual quality adjustment function of FIG. 2.

FIG. 11 illustrates exemplary values of the parameter, $\mu$, with reference to exemplary values of the frame complexity, $C_F$. Moreover, to avoid allocating either too few bits or too many bits to the respective video frames, which can be potentially problematic while the video encoder 106 performs the rate control function, suitable minimum and maximum values can be specified for the values of the frame complexity, $C_F$.

Figure 12:
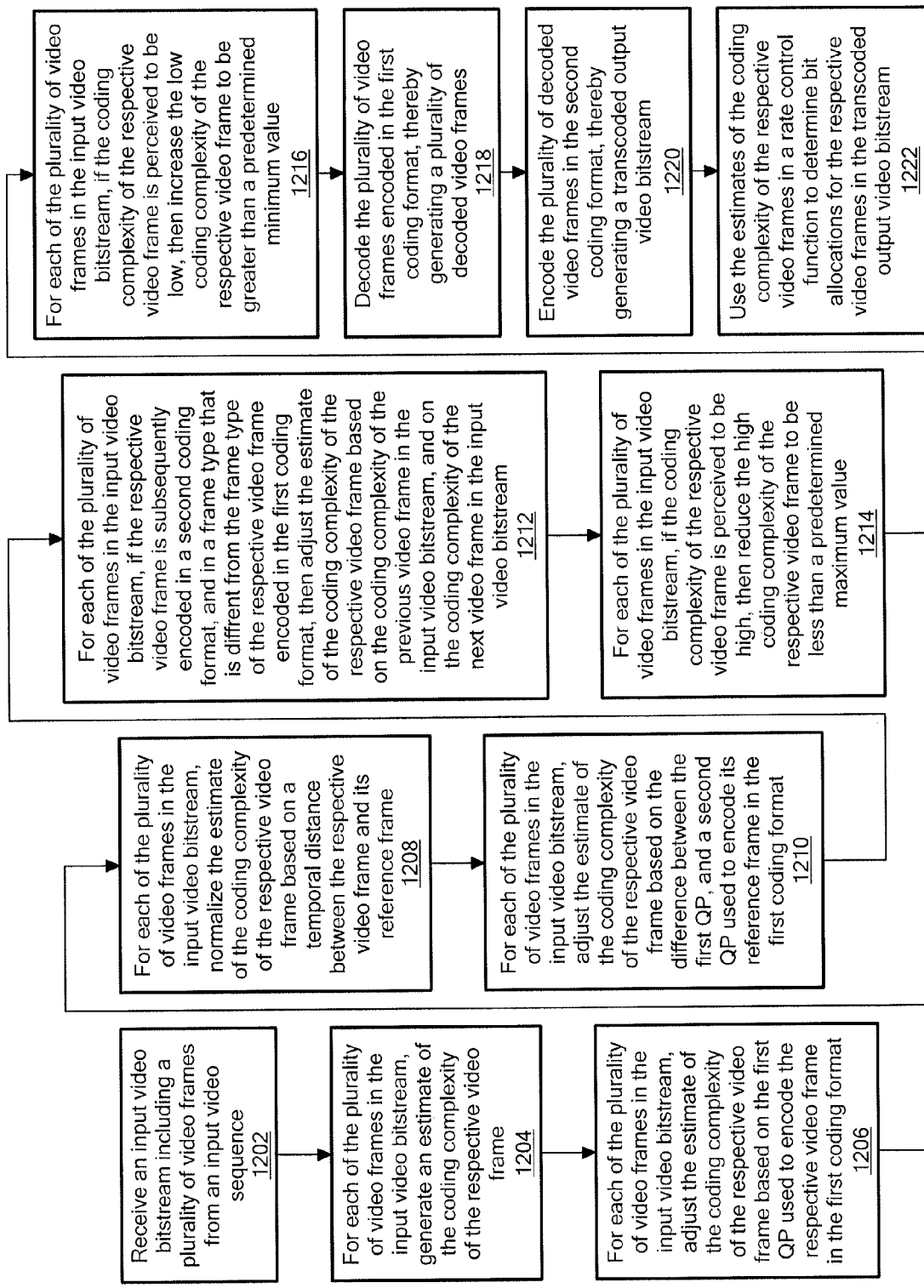
FIG. 12 is a flow diagram of a method of operating the exemplary video transcoding system of FIG. 1 in accordance with an exemplary embodiment of the present application.

An illustrative method of transcoding video bitstreams, in accordance with the present application, is described below with reference to FIGS. 1, 2, and 12. As depicted in step 1202 (see FIG. 12), the data collector 102.1 within the bitstream analyzer 102 (see FIG. 1) receives an input video bitstream including a plurality of video frames from an input video sequence. Each of the plurality of video frames in the input video bitstream is encoded in a first coding format using a first quantization parameter (QP). As depicted in step 1204, for each of the plurality of video frames in the input video bitstream, the coding complexity estimator 102.2 within the bitstream analyzer 102 (see FIG. 1) generates an estimate of the coding complexity of the respective video frame. As depicted in step 1206, for each of the plurality of video frames in the input video bitstream, the coding complexity estimator 102.2 employs the input quality adjustment function 204 (see FIG. 2) to adjust the estimate of the coding complexity of the respective video frame based on the first QP used to encode the respective video frame in the first coding format. Further, as depicted in step 1208, for each of the plurality of video frames in the input video bitstream, the coding complexity estimator 102.2 employs the temporal distance adjustment function 206 (see FIG. 2) to normalize the estimate of the coding complexity of the respective video frame based on a temporal distance between the respective video frame and its reference frame. As depicted in step 1210, for each of the plurality of video frames in the input video bitstream, the coding complexity estimator 102.2 employs the CBR adjustment function 208 (see FIG. 2) to adjust the estimate of the coding complexity of the respective video frame based on the difference between the first QP, and a second QP used to encode its reference frame in the first coding format. Moreover, as depicted in step 1212, for each of the plurality of video frames in the input video bitstream, if the respective video frame is subsequently encoded in the video encoder 106 (see FIG. 1) in a second coding format, and in a frame type that is different from the frame type of the respective video frame encoded in the first coding format, then the coding complexity estimator 102.2 employs the CBR adjustment function 208 to adjust the estimate of the coding complexity of the respective video frame based on the coding complexity of the previous video frame in the input video bitstream, and on the coding complexity of the next video frame in the input video bitstream. It is noted that the second coding format may be the same as, or different from, the first coding format. In addition, as depicted in step 1214, for each of the plurality of video frames in the input video bitstream, if the coding complexity of the respective video frame is perceived to be high, then the coding complexity estimator 102.2 employs the perceptual quality adjustment function 210 to reduce the high coding complexity of the respective video frame to be less than a predetermined maximum value. Further, as depicted in step 1216, for each of the plurality of video frames in the input video bitstream, if the coding complexity of the respective video frame is perceived to be low, then the coding complexity estimator 102.2 employs the perceptual quality adjustment function 210 to increase the low coding complexity of the respective video frame to be greater than a predetermined minimum value. As depicted in step 1218, the video decoder 104 (see FIG. 1) decodes the plurality of video frames encoded in the first coding format, thereby generating a plurality of decoded video frames. As depicted in step 1220, the video encoder 106 encodes the plurality of decoded video frames in the second coding format, thereby generating a transcoded output video bitstream. As depicted in step 1222, the video encoder 106 uses the estimates of the coding complexity of the respective video frames in a rate control function to determine bit allocations for the respective video frames in the transcoded output video bitstream.

EXAMPLES

The disclosed systems and methods of transcoding video bitstreams will be further understood with reference to the following illustrative, non-limiting examples and FIGS. 1 and 13-15. In a first illustrative example, 18 exemplary input video sequences, each comprising a plurality of video frames, are applied to the external video encoder 108 (see FIG. 1). The respective exemplary input video sequences include two exemplary sequences, specifically, a CIF sequence and a concatenated VGA sequence. Moreover, three different video encoders for encoding the exemplary input video sequences according to the H.264 coding format are employed as the external video encoder 108, including a JM 16.2 video encoder, an x264 video encoder, and an IPP H.264 video encoder. The CIF sequence is encoded by the respective external video encoders at 128 Kbps, 192 Kbps, and 300 Kbps, and the VGA sequence is encoded by the respective external video encoders at 350 Kbps, 650 Kbps, and 1.0 Mbps.

Figure 13:
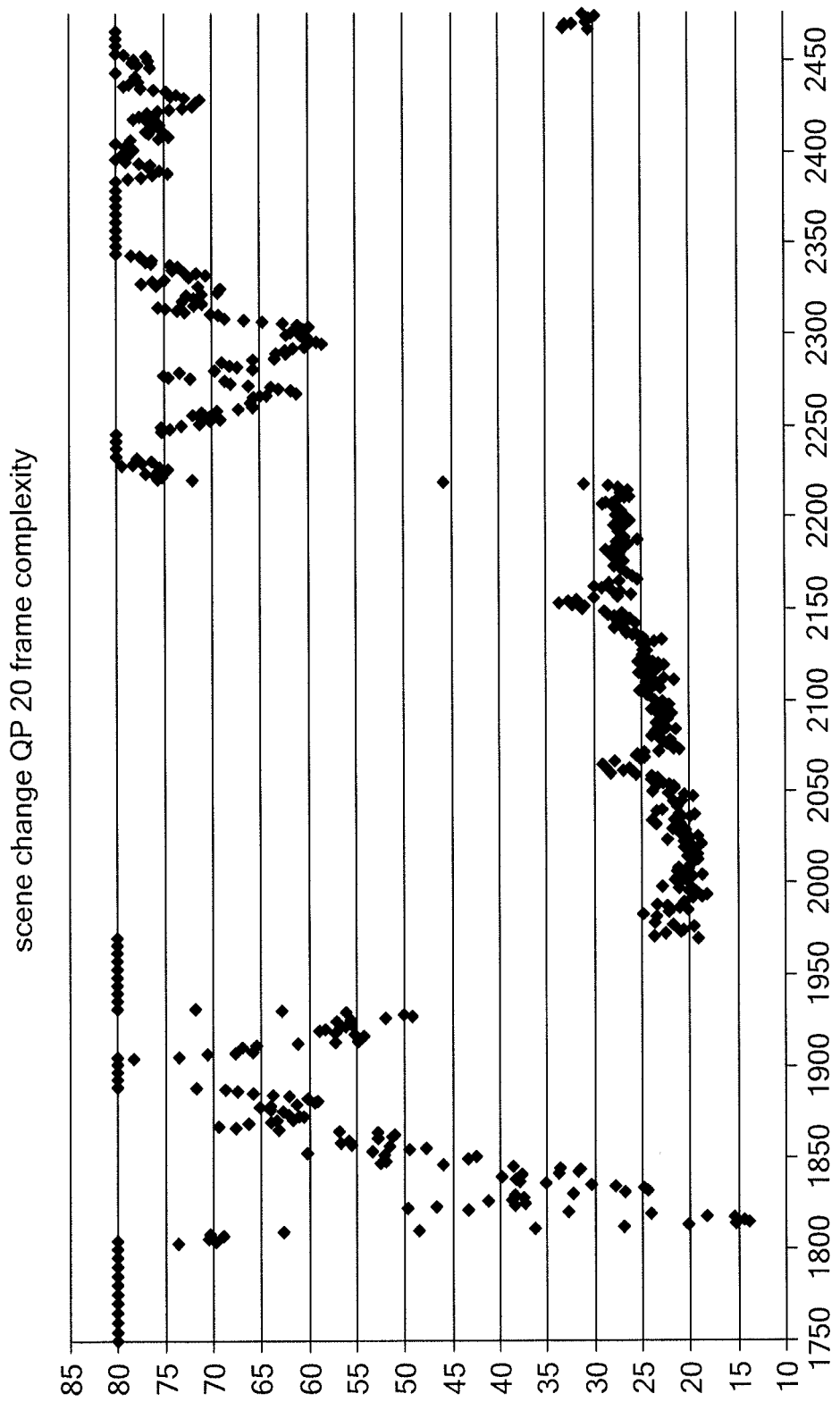
FIG. 13 is a diagram of exemplary estimates of the coding complexity of video frames from a plurality of exemplary input bitstreams, generated using the exemplary coding complexity estimation technique of FIG. 2.

FIG. 13 depicts estimated values of the frame complexity, $C_F$, generated by the coding complexity estimator 102.2 (see FIG. 1) using the disclosed coding complexity estimation technique 200 (see FIG. 2), for the respective exemplary input video sequences. Using these estimates of the frame complexity, $C_F$, and the reference quantization parameter, $QP_{ref\_est}$, to be equal to 32, input bitstreams are encoded by the video encoder 106 to obtain reference values of the frame complexity, $C_F$. In accordance with this first illustrative example, it can be observed that the bias between the estimated values of the frame complexity, $C_F$, and the reference values of the frame complexity, $C_F$, is less than 2%, and the average of the absolute error for each video frame is about 16%. Moreover, the overhead in speed using the disclosed coding complexity estimation technique 200 is about 3.7% for the input bitstreams.

It was described above that the coding complexity estimator 102.2 provides estimates of the frame complexity, $C_F$, to the video encoder 106, which can employ the estimates of the frame complexity, $C_F$, in a rate control function to adapt the video transcoding system 100 to the network environment in which the system is employed. In a second illustrative example, the video encoder 106 is configured as follows—IPPPP, H.264 to H.264 transcoding, the frame rate equal to 30 fps, the bit rate equal to 300 Kbps, High profile, and CABAC entropy coding. In this exemplary configuration, the video encoder 106 implements the rate control function to allocate bits to the respective video frames in the input bitstreams.

Figure 14:
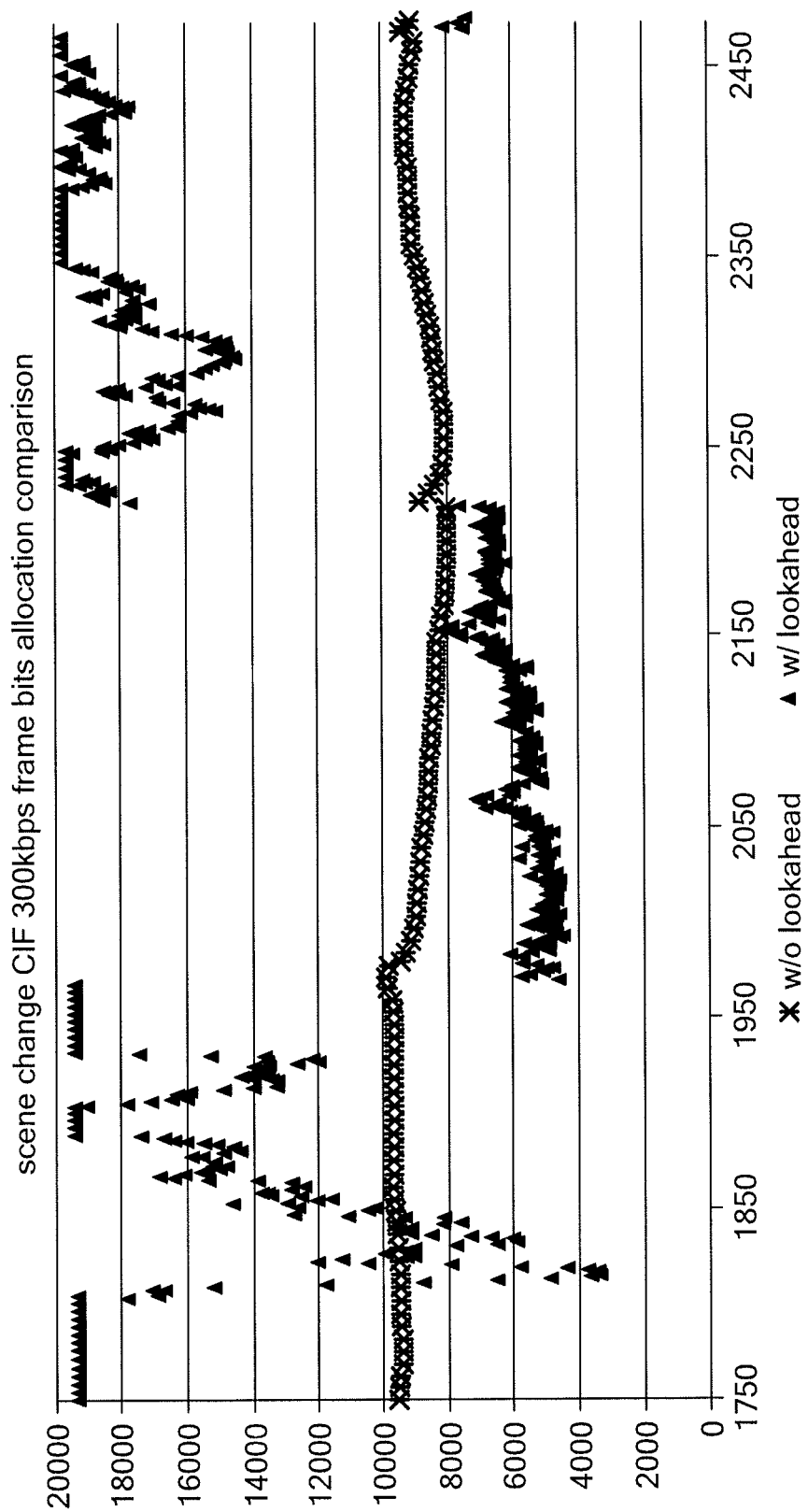
FIG. 14 is a diagram of exemplary frame bit allocations resulting from execution of a rate control function by the exemplary video transcoding system of FIG. 1, generated or otherwise obtained using the exemplary coding complexity estimation technique of FIG. 2.

FIG. 14 depicts the frame bit allocation resulting from the execution of the rate control function by the video encoder 106, using estimates of the frame complexity, $C_F$, obtained by both a conventional coding complexity estimation technique and the coding complexity estimation technique 200 that is disclosed in accordance with the present application. As depicted in FIG. 14, when the conventional coding complexity estimation technique is employed, the video encoder 106 allocates a similar amount of bits to each video frame, based on a specified virtual buffer status and a specified target bitrate, regardless of the frame complexity, $C_F$. However, when the disclosed coding complexity estimation technique 200 is employed, FIG. 14 depicts that the video encoder 106 uses actual values of the frame complexity, $C_F$, to allocate a larger number of bits to the more complicated video frames, and to allocate a smaller number of bits to the less complicated video frames.

Figure 15:
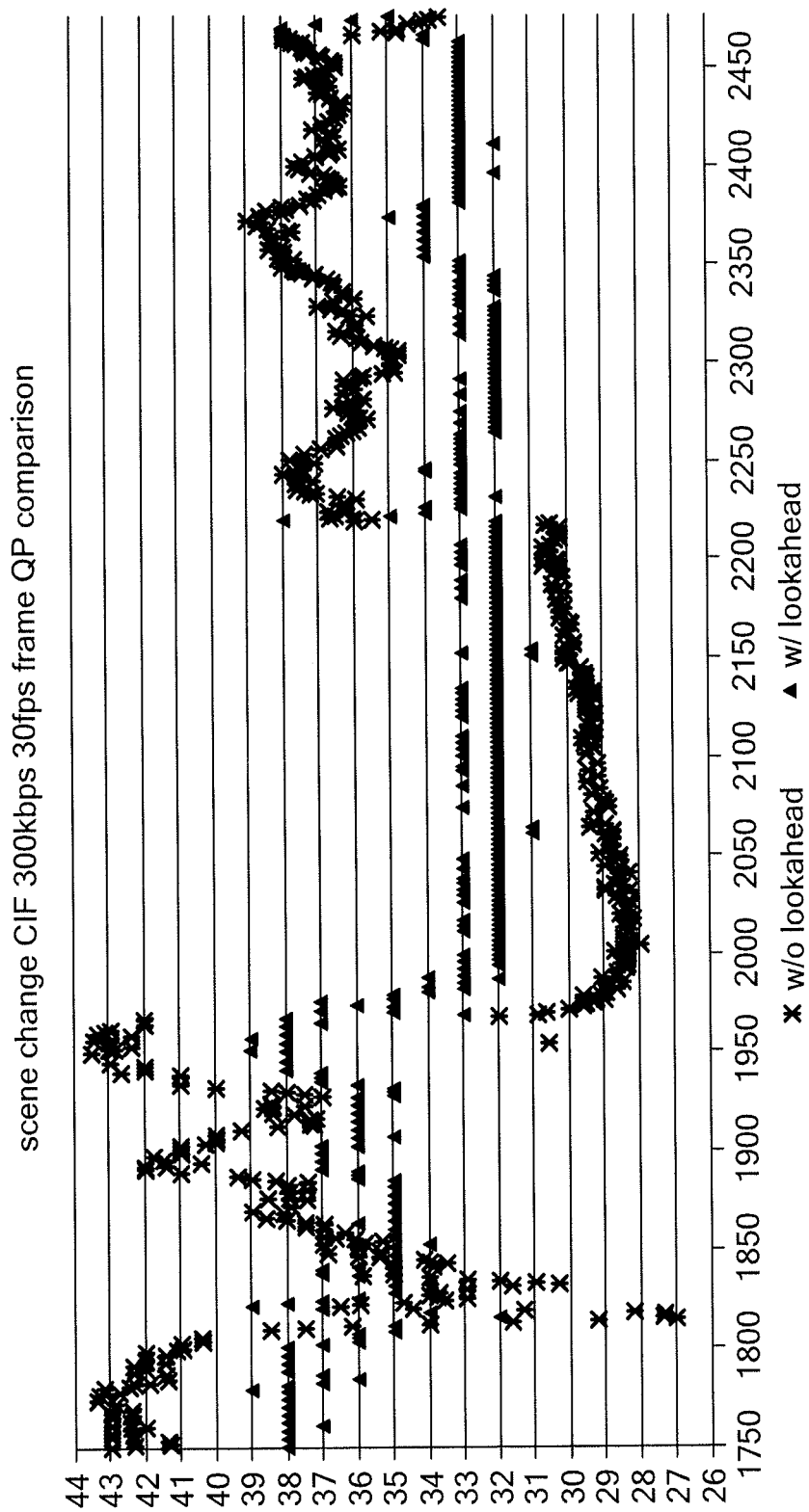
FIG. 15 is a diagram of an exemplary quantization parameter distribution resulting from the execution of the rate control function by the exemplary video transcoding system of FIG. 1, generated or otherwise obtained using the exemplary coding complexity estimation technique of FIG. 2.

FIG. 15 depicts the quantization parameter, QP, distribution resulting from the execution of the rate control function by the video encoder 106, using the estimates of the frame complexity, $C_F$, obtained by the same conventional coding complexity estimation technique used in FIG. 14, and the disclosed coding complexity estimation technique 200 (see FIG. 2). As depicted in FIG. 15, for the disclosed coding complexity estimation technique 200, the QP fluctuations are much smoother than those obtained when the conventional coding complexity estimation technique is employed, thereby enhancing overall perceptual quality. Because the video encoder 106 uses the actual values of the frame complexity, $C_F$, while employing the disclosed coding complexity estimation technique 200, a larger number of bits are allocated to the more complicated video frames, and a smaller number of bits are allocated to the less complicated video frames, thereby resulting in a generally smoother distribution of the quantization parameter, QP.

It is noted that the operations performed by the above-described illustrative embodiments are purely exemplary and imply no particular order. Further, these operations can be used in any sequence when appropriate and/or can be partially used. With the above embodiments in mind, it should be understood that the above-described systems and methods can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared, or otherwise manipulated.

Moreover, any of the operations described herein that form part of the above-described systems and methods are useful machine operations. The presently disclosed systems relate to devices or apparatuses for performing these operations. The devices or apparatuses can be specially constructed for the required purpose, or can be a general-purpose computer selectively activated or configured by a computer program stored in the computer. In particular, various general-purpose machines can be used with computer programs written in accordance with the teachings herein, or it may be more convenient to construct a specialized apparatus to perform the required operations.

The above-described systems and methods can be embodied at least in part as computer readable code on a computer readable medium. The computer readable medium is any data storage device that can store data, which can thereafter be read by a computer system. Examples of a computer readable medium include hard drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of transcoding a video bitstream in a video transcoding system, the video transcoding system including a video bitstream analyzer, a video decoder, and a video encoder, the method comprising the steps of:

receiving, at the video bitstream analyzer, an input video bitstream including a plurality of video frames from an input video sequence, the respective video frames being encoded in a first coding format;

for each of at least some of the plurality of video frames in the input video bitstream:

generating, by the video bitstream analyzer, an estimation representing a coding complexity of the respective video frame; and adjusting, by the video bitstream analyzer, the estimation representing the coding complexity of the respective video frame, the adjusting including:

obtaining one or more of (1) a first adjustment parameter that is a first function of a current quantization parameter (QP) used to encode the respective video frame, (2) a second adjustment parameter that is a second function of a temporal distance between the respective video frame and a reference video frame used to encode the respective video frame, and, (3) in the event the respective video frame is encoded in the first coding format as a P-frame, a third adjustment parameter that is a third function of a difference between a reference QP used to encode the reference video frame and the current QP;

applying one or more of the first, second, and third adjustment parameters to the estimation representing the coding complexity of the respective video frame to obtain an adjusted coding complexity estimation of the respective video frame; and in the event the respective video frame is encoded in the first coding format as the P-frame, applying, at least at some times, a fourth function to the adjusted coding complexity estimation of the respective video frame, the fourth function being expressed as, $$C_F(\text{current\_frame}) = \omega_1 * C_F(\text{previous\_frame}) + \omega_2 * C_F(\text{current\_frame}) + \omega_3 * C_F(\text{next\_frame}),$$

wherein "$C_F(\text{current\_frame})$" is the adjusted coding complexity estimation of the respective video frame, "$C_F(\text{previous\_frame})$" is a predetermined coding complexity of a previous P-frame in the input video bitstream, "$C_F(\text{next\_frame})$" is another predetermined coding complexity of a next P-frame in the input video bitstream, and "$\omega_1$", "$\omega_2$", and "$\omega_3$" are each a predetermined weighting value;

decoding, by the video decoder, the plurality of video frames to generate a plurality of decoded video frames; and encoding, by the video encoder, the plurality of decoded video frames in a second coding format to generate a plurality of transcoded video frames in an output video bitstream, the encoding including applying a rate control function to at least some adjusted coding complexity estimations of the respective video frames to determine bit allocations for the plurality of transcoded video frames in the output video bitstream.

2. The method of claim 1 wherein each of the plurality of video frames includes a plurality of macroblocks (MBs), and wherein the generating of the estimation representing the coding complexity of the respective video frame includes generating estimations representing the coding complexities of the plurality of MBs included in the respective video frame.

3. The method of claim 2 wherein the generating of the estimation representing the coding complexity of the respective video frame further includes generating the estimation representing the coding complexity of the respective video frame as a sum of the coding complexities of the plurality of MBs.

4. The method of claim 1 wherein the obtaining of one or more of the first, second, and third adjustment parameters includes obtaining a fifth adjustment parameter that is a fifth function of the coding complexity of the respective video frame, and wherein the coding complexity of the respective video frame is less than or equal to a predetermined maximum value.

5. The method of claim 1 wherein the obtaining of one or more of the first, second, and third adjustment parameters includes obtaining a fifth adjustment parameter that is a fifth function of the coding complexity of the respective video frame, and wherein the coding complexity of the respective video frame is greater than or equal to a predetermined minimum value.

6. The method of claim 1 wherein the predetermined weighting value $\omega_1$ is equal to $15/32$, the predetermined weighting value $\omega_2$ is equal to $1/16$, and the predetermined weighting value $\omega_3$ is equal to the predetermined weighting value $\omega_1$.

7. A method of transcoding a video bitstream in a video transcoding system, the video transcoding system including a video bitstream analyzer, a video decoder, and a video encoder, the method comprising the steps of:

receiving, at the video bitstream analyzer, an input video bitstream including a plurality of video frames from an input video sequence, the respective video frames being encoded in a first coding format;

for each of at least some of the plurality of video frames in the input video bitstream:

generating, by the video bitstream analyzer, an estimation representing a coding complexity of the respective video frame; and adjusting, by the video bitstream analyzer, the estimation representing the coding complexity of the respective video frame, the adjusting including:

obtaining one or more of (1) a first adjustment parameter that is a first function of a current quantization parameter (QP) used to encode the respective video frame, (2) a second adjustment parameter that is a second function of a temporal distance between the respective video frame and a reference video frame used to encode the respective video frame, and, (3) in the event the respective video frame is encoded in the first coding format as a P-frame, a third adjustment parameter that is a third function of a difference between a reference QP used to encode the reference video frame and the current QP; and applying one or more of the first, second, and third adjustment parameters to the estimation representing the coding complexity of the respective video frame to obtain an adjusted coding complexity estimation of the respective video frame;

decoding, by the video decoder, the plurality of video frames to generate a plurality of decoded video frames;

encoding, by the video encoder, the plurality of decoded video frames in a second coding format to generate a plurality of transcoded video frames in an output video bitstream, the encoding including applying a rate control function to at least some adjusted coding complexity estimations of the respective video frames to determine bit allocations for the plurality of transcoded video frames in the output video bitstream; and in the event the respective video frame is encoded in the first coding format as the P-frame, and, subsequent to the decoding of the respective video frame, encoded in the second coding format as an I-frame, applying, at least at some times, a fourth function to the adjusted coding complexity estimation of the respective video frame, the fourth function being expressed as, $$C_F(\text{current\_frame}) = C_F(\text{current\_frame}) * \theta \& \upsilon + I\_\text{complexity\_prev} * (1-\upsilon),$$

wherein "$C_F(\text{current\_frame})$" is the adjusted coding complexity estimation of the respective video frame, "I_complexity_prev" is a predetermined coding complexity of a previous I-frame in the input video bitstream, "$\theta$" is a predetermined fourth adjustment parameter, and "$\upsilon$" is a predetermined weighting parameter.

8. The method of claim 7 further comprising:

determining, from a history of the encoding of the plurality of decoded video frames, one or more of the predetermined fourth adjustment parameter $\theta$ and the predetermined weighting parameter $\upsilon$ by obtaining at least one ratio of intra-coded macroblocks in respective I-frames.

9. A non-transitory, computer-readable medium comprising computer-executable instructions which, when executed by a processor in a computing device, cause the computing device to perform a method of transcoding a video bitstream in a video transcoding system, the video transcoding system including a video bitstream analyzer, a video decoder, and a video encoder, the video bitstream analyzer including a data collector and a coding complexity estimator, the method comprising:

receiving, at the data collector, an input video bitstream, the input video bitstream including a plurality of video frames from an input video sequence, the respective video frames being encoded in a first coding format, and for each of at least some of the plurality of video frames in the input video bitstream:

generating, by the coding complexity estimator, an estimation representing a coding complexity of the respective video frame; and adjusting, by the coding complexity estimator, the estimation representing the coding complexity of the respective video frame, the adjusting further including:

obtaining one or more of (1) a first adjustment parameter that is a first function of a current quantization parameter (QP) used to encode the respective video frame, (2) a second adjustment parameter that is a second function of a temporal distance between the respective video frame and a reference video frame used to encode the respective video frame, and, (3) in the event the respective video frame is encoded in the first coding format as a P-frame, a third adjustment parameter that is a third function of a difference between a reference QP used to encode the reference video frame and the current QP;

applying one or more of the first, second, and third adjustment parameters to the estimation representing the coding complexity of the respective video frame, thereby obtaining an adjusted coding complexity estimation of the respective video frame; and in the event the respective video frame is encoded in the first coding format as the P-frame, applying, at least at some times, a fourth function to the adjusted coding complexity estimation of the respective video frame, the fourth function being expressed as, $$C_F(\text{current\_frame}) = \omega_1 * C_F(\text{previous\_frame}) + \omega_2 * C_F(\text{current\_frame}) + \omega_3 * C_F(\text{next\_frame}),$$

wherein "$C_F(\text{current\_frame})$" is the adjusted coding complexity estimation of the respective video frame, "$C_F(\text{previous\_frame})$" is a predetermined coding complexity of a previous P-frame in the input video bitstream, "$C_F(\text{next\_frame})$" is another predetermined coding complexity of a next P-frame in the input video bitstream, and "$\omega_1$", "$\omega_2$", and "$\omega_3$" are each a predetermined weighting value;

decoding, by the video decoder, the plurality of video frames, thereby generating a plurality of decoded video frames;

encoding, by the video encoder, the plurality of decoded video frames in a second coding format, thereby generating a plurality of transcoded video frames in an output video bitstream; and applying, by the video encoder, a rate control function to at least some adjusted coding complexity estimations of the respective video frames to determine bit allocations for the plurality of transcoded video frames in the output video bitstream.

10. The non-transitory, computer-readable medium of claim 9 wherein each of the plurality of video frames includes a plurality of macroblocks (MBs), and wherein the method further comprises:

generating, by the video bitstream analyzer, estimations representing the coding complexities of the plurality of MBs included in the respective video frame.

11. The non-transitory, computer-readable medium of claim 10 wherein the method further comprises:

generating, by the video bitstream analyzer, the estimation representing the coding complexity of the respective video frame as a sum of the coding complexities of the plurality of MBs.

12. The non-transitory, computer-readable medium of claim 9 wherein the predetermined weighting value $\omega_1$ is equal to $15/32$, the predetermined weighting value $\omega_2$ is equal to $1/16$, and the predetermined weighting value $\omega_3$ is equal to the predetermined weighting value $\omega_1$.

13. A non-transitory, computer-readable medium comprising computer-executable instructions which, when executed by a processor in a computing device, cause the computing device to perform a method of transcoding a video bitstream in a video transcoding system, the video transcoding system including a video bitstream analyzer, a video decoder, and a video encoder, the video bitstream analyzer including a data collector and a coding complexity estimator, the method comprising:

employing, by the video bitstream analyzer, a look-ahead approach to video transcoding, the employing of the look-ahead approach to video transcoding including:

wherein the data collector is operative to receive receiving, at the data collector, an input video bitstream, the input video bitstream including a plurality of video frames from an input video sequence, the respective video frames being encoded in a first coding format;

for each of at least some of the plurality of video frames in the input video bitstream:

to generate generating, by the coding complexity estimator, an estimation representing a coding complexity of the respective video frame; and to adjust adjusting, by the coding complexity estimator, the estimation representing the coding complexity of the respective video frame, the adjusting further including:

to obtain obtaining one or more of (1) a first adjustment parameter that is a first function of a current quantization parameter (QP) used to encode the respective video frame, (2) a second adjustment parameter that is a second function of a temporal distance between the respective video frame and a reference video frame used to encode the respective video frame, and, (3) in the event the respective video frame is encoded in the first coding format as a P-frame, a third adjustment parameter that is a third function of a difference between a reference QP used to encode the reference video frame and the current QP;

to apply applying one or more of the first, second, and third adjustment parameters to the estimation representing the coding complexity of the respective video frame, thereby obtaining an adjusted coding complexity estimation of the respective video frame; and in the event the respective video frame is encoded in the first coding format as the P-frame, applying, at least at some times, a fourth function to the adjusted coding complexity estimation of the respective video frame, the fourth function being expressed as, $$C_F(\text{current\_frame}) = \omega_1 * C_F(\text{previous\_frame}) + \omega_2 * C_F(\text{current\_frame}) + \omega_3 * CF(\text{next\_frame}),$$

wherein "$C_F(\text{current\_frame})$" is the adjusted coding complexity estimation of the respective video frame, "$C_F(\text{previous\_frame})$" is a predetermined coding complexity of a previous P-frame in the input video bitstream, "$C_F(\text{next\_frame})$" is another predetermined coding complexity of a next P-frame in the input video bitstream, and "$\omega_1$", "$\omega_2$", and "$\omega_3$" are each a predetermined weighting value; a video decoder operative to decode the plurality of video frames, thereby generating a plurality of decoded video frames;

a video encoder operative to encode encoding, by the video encoder, the plurality of decoded video frames in a second coding format, thereby generating a plurality of transcoded video frames in an output video bitstream; and applying, by the video encoder, a rate control function to at least some adjusted coding complexity estimations of the respective video frames to determine bit allocations for the plurality of transcoded video frames in the output video bitstream.

14. The non-transitory, computer-readable medium of claim 13 wherein the predetermined weighting value $\omega_1$ is equal to $15/32$, the predetermined weighting value $\theta_2$ is equal to $1/16$, and the predetermined weighting value $\omega_3$ is equal to the predetermined weighting value $\omega_1$.

* * * * *